(12) United States Patent
Liang et al.

(10) Patent No.: US 11,909,066 B1
(45) Date of Patent: Feb. 20, 2024

(54) BATTERY END COVER ASSEMBLY, ENERGY STORAGE APPARATUS AND ELECTRIC DEVICE

(71) Applicants: Shenzhen Hairun New Energy Technology Co., Ltd., Shenzhen (CN); Xiamen Hithium Energy Storage Technology Co., Ltd., Xiamen (CN)

(72) Inventors: Jinyun Liang, Xiamen (CN); Liangliang Zhang, Xiamen (CN); Wancai Zhang, Xiamen (CN); Ming Yang, Xiamen (CN)

(73) Assignees: Shenzhen Hithium Energy Storage Technology Co., Ltd., Shenzhen (CN); Xiamen Hithium Energy Storage Technology Co., Ltd., Xiamen (CN)

( * ) Notice: Subject to any disclaimer, the term of this patent is extended or adjusted under 35 U.S.C. 154(b) by 0 days.

(21) Appl. No.: 18/109,332

(22) Filed: Feb. 14, 2023

(30) Foreign Application Priority Data

Nov. 11, 2022 (CN) .......................... 202211412919.2

(51) Int. Cl.
  *H01M 50/342* (2021.01)
  *H01M 50/627* (2021.01)
  *H01M 50/55* (2021.01)
  *H01M 50/15* (2021.01)

(52) U.S. Cl.
  CPC ....... *H01M 50/3425* (2021.01); *H01M 50/15* (2021.01); *H01M 50/55* (2021.01); *H01M 50/627* (2021.01)

(58) Field of Classification Search
  None
  See application file for complete search history.

(56) References Cited

U.S. PATENT DOCUMENTS

| | | | |
|---|---|---|---|
| 2011/0212350 A1* | 9/2011 | Sato | H01M 50/3425 429/56 |
| 2021/0238720 A1* | 8/2021 | Tamaki | H01M 50/159 |
| 2022/0311085 A1 | 9/2022 | Li et al. | |
| 2022/0336913 A1 | 10/2022 | Gu et al. | |

FOREIGN PATENT DOCUMENTS

| | | |
|---|---|---|
| CN | 212571194 U | 2/2021 |
| CN | 114497876 A | 5/2022 |
| CN | 216698639 U | 6/2022 |
| CN | 216980798 U | 7/2022 |
| CN | 217334238 U | 8/2022 |
| JP | 2009259606 A | 11/2009 |
| JP | 2014186920 A | 10/2014 |

* cited by examiner

*Primary Examiner* — Haixia Zhang
(74) *Attorney, Agent, or Firm* — IPro, PLLC

(57) ABSTRACT

The present application discloses a battery end cover assembly, an energy storage apparatus and an electric device. The battery end cover assembly includes an end cover; terminal assemblies connected to the end cover; and a pressure relief mechanism disposed on the end cover, wherein the area of a figure formed by an outer contour of the end cover is a first area S1, the area of a projection of the pressure relief mechanism on the end cover is a second area S2, and the second area S2 accounts for 0.5% to 5% of the first area S1. According to the present application, the probability of untimely pressure relief is reduced, and the safety of a battery is improved. Moreover, the overall structural strength of the battery end cover assembly can be guaranteed, and the probability that the pressure relief mechanism falls off to be invalid is reduced.

17 Claims, 12 Drawing Sheets

BATTERY END COVER ASSEMBLY, ENERGY STORAGE APPARATUS AND ELECTRIC DEVICE

CROSS REFERENCE TO RELATED APPLICATIONS

The disclosure claims priority to Chinese Patent Application No. 202211412919.2 filed to the State Intellectual Property Office of China on Nov. 11, 2022 and entitled "Battery End Cover Assembly, Energy Storage Apparatus and Electric Device", which is incorporated herein by reference in its entirety.

TECHNICAL FIELD

The present application relates to the technical field of batteries, in particular to a battery end cover assembly, an energy storage apparatus and an electric device.

BACKGROUND

In the related art, each of a mobile phone, a notebook computer, an electric tool, an electric vehicle, etc. adopts batteries as a power source, for example, the electric vehicle needs to adopt a power battery pack composed of a plurality of batteries.

A battery is provided with an anti-explosion and pressure relief structure on a cover plate, for example, the cover plate of the battery is provided with a thin-walled valve body, when an internal pressure of the battery exceeds a specified value, a thin wall of the valve body ruptures to release the internal pressure, and thus, the battery is prevented from being exploded and fractured. In an existing solution, the anti-explosion and pressure relief structure is relatively constant in specification and has the situation of untimely pressure relief caused by overhigh relief pressure, and thus, the safety of the battery is affected.

SUMMARY

The purpose of the present application is to at least solve one of technical problems existing in the prior art. Therefore, the present application provides a battery end cover assembly by which the area taken up by a pressure relief mechanism is more matched with the area of an end cover, and thus, the battery end cover assembly is matched with the pressure relief capacity of a battery.

The present application further provides an energy storage apparatus adopting the above-mentioned battery end cover assembly.

The present application further provides an electric device adopting the above-mentioned energy storage apparatus.

The battery end cover assembly according to an embodiment in a first aspect of the present application includes an end cover; terminal assemblies, the terminal assemblies being connected to the end cover; and a pressure relief mechanism, the pressure relief mechanism being disposed on the end cover, and the pressure relief mechanism and the terminal assemblies being distributed at intervals in the length direction of the end cover; wherein the area of a figure formed by an outer contour of the end cover is a first area $S1$, the area of a projection of the pressure relief mechanism on the end cover is a second area $S2$, and the second area $S2$ accounts for 0.5% to 5% of the first area $S1$. The size of the pressure relief mechanism in the length direction of the end cover is $b1$, and $b1$ accounts for 5% to 12% of the length $b0$ of the end cover; and the size of the pressure relief mechanism in the width direction of the end cover is $e1$, and $e1$ accounts for 15% to 25% of the width $e0$ of the end cover.

For the battery end cover assembly according to the embodiment in the first aspect of the present application, by limiting the proportion of the second area $S2$ to the first area $S1$ to be not less than 0.5%, the area taken up by the pressure relief mechanism cannot be too small, there is a pressure relief opening large enough for exhaust after the pressure relief mechanism is opened, so that the size of the battery end cover assembly is relatively matched with the pressure relief capacity, the probability of untimely pressure relief is reduced, and the safety of a battery is improved. By limiting the proportion of the second area $S2$ to the first area $S1$ to be not more than 5%, the area taken up by the pressure relief mechanism cannot be too large, in this way, the overall structural strength of the battery end cover assembly can be guaranteed, and the battery end cover assembly is not easy to deform after bearing a pressure.

By controlling the proportion of the length $b1$ of the pressure relief mechanism to the length $b0$ of the end cover to be at least 5%, it is beneficial for the pressure relief mechanism to take up an area large enough for pressure relief and exhaust, thereby guaranteeing the smoothness of exhaust; and by limiting the proportion of the length $b1$ of the pressure relief mechanism to the length $b0$ of the end cover to be not more than 12%, a certain space may be vacated on the end cover to place the terminal assemblies, so that mounting inconvenience and even mutual interference caused by disposing the pressure relief mechanism to be too close to the terminal assemblies are avoided. Furthermore, the length $b1$ of the pressure relief mechanism is limited to avoid excessive deformation caused by an overlarge bending moment borne due to the overlarge length of the pressure relief mechanism, so that the situation that the pressure relief mechanism is easy to fall off due to the excessive deformation is avoided, in this way, the problems that the exhaust direction cannot be limited and the exhaust is obstructed by the separated pressure relief mechanism due to the fact that the pressure relief mechanism is ejected away from the end cover by a high-pressure gas at high pressure are also avoided.

By controlling the proportion of the width $e1$ of the pressure relief mechanism to the width $e0$ of the end cover to be at least 15%, the pressure relief mechanism can take up an area large enough for pressure relief and exhaust, thereby guaranteeing the smoothness of exhaust. By controlling the proportion of the width $e1$ of the pressure relief mechanism to the width $e0$ of the end cover to be not more than 25%, the probability that the side, located on the pressure relief mechanism, of the end cover is too narrow to be easily fractured is reduced, in this way, the risk that the pressure relief mechanism is easy to fall off from the end cover is also avoided.

In summary, by limiting the area, length and width proportions of the pressure relief mechanism on the end cover, the pressure relief mechanism can take up the area large enough for pressure relief and exhaust, thereby guaranteeing smooth and timely exhaust; and meanwhile, each side, located on the pressure relief mechanism, of the end cover does not have to be set to be too narrow, so that the risk that the edge of the end cover is easily fractured due to the overlarge length and width of the pressure relief mechanism is avoided, and the situation that the end cover is bent and fractured when bearing an impact and a pressure is avoided. Moreover, there is a sufficient space for arranging components on the end cover so that all the components can be spaced without mutual interference. Furthermore, the structural strength of the end cover can be guaranteed, and the end cover is prevented from being bent and fractured when suffering from an impact and a pressure. Excessive deformation caused when the end cover bears a pressure is avoided, the probability that a gas is exhausted from the edge of the end cover when the internal temperature or pressure of the battery is overhigh is avoided, it is ensured that the gas is only exhausted from the pressure relief mechanism, the exhaust direction of the gas in the battery can be effectively controlled, it is convenient to perform subsequent treatment on exhausted electrolyte or high-temperature gas, and unwanted corrosion, fire hazards, etc. caused by arbitrary emission of the electrolyte or high-temperature gas in the battery are avoided.

In some embodiments, the pressure relief mechanism includes an anti-explosion valve, and the anti-explosion valve includes a preset opening area; and the anti-explosion valve is provided with a notch groove, and the notch groove is located in the preset opening area.

Therefore, the anti-explosion valve is adopted for pressure relief, compared with a component such as a pressure relief valve and a one-way valve, the anti-explosion valve is relatively thin, it is unnecessary to vacate overmuch space for the pressure relief mechanism, which is beneficial to the improvement of the arrangement intensity of an internal structure of the battery, thereby being beneficial to the increment of the energy density of the battery. Moreover, after the internal structure of the battery is tightly arranged, the structural strength is also favorably improved.

Specifically, the minimum thickness of the anti-explosion valve on the position of the notch groove is a first thickness n1, the thickness of the anti-explosion valve on the position of the preset opening area is a second thickness n2, and the first thickness n1 accounts for 15% to 25% of the second thickness n2. Here, the thickness proportions of the anti-explosion valve on the positions of the notch groove and the preset opening area are limited, so that the preset opening area cannot to be too thick while the anti-explosion valve on the position of the notch groove is relatively thin. The anti-explosion valve on the position of the notch groove is relatively thin, so that the anti-explosion valve on the position of the notch groove can be opened in time when an internal pressure or temperature of the battery reaches a threshold value. The preset opening area cannot be too thick, so that the preset opening area is easily impacted by the high-pressure gas after the position of the notch groove is opened, and the pressure relief opening can be completely opened for smooth exhaust. By limiting the thickness of the anti-explosion valve on the position of the preset opening area to be at least four times as large as the thickness of that on the position of the notch groove, when the anti-explosion valve is impacted by the internal pressure or is overhigh in temperature, the pressure can be centralized on the position of the notch groove, and the position, where the pressure is centralized in the notch groove, of the anti-explosion valve is opened, so that more timely exhaust is achieved, and the working sensitivity of the anti-explosion valve is favorably improved.

Specifically, the area of a projection of the notch groove on the end cover is a third area S3, and the third area S3 accounts for 1.0% to 1.5% of the second area S2. Therefore, the proportion of the third area S3 to the second area S2 cannot be too small, there may be more areas on the position of the notch groove to induce pressure or temperature variation when the internal pressure or temperature of the battery reaches the threshold value, so that the anti-explosion valve can be opened in time for pressure relief, and then, the working sensitivity of the anti-explosion valve can be improved. The limitation for the proportion of the third area S3 to the second area S2 does not affect the timely opening of the anti-explosion valve when the internal pressure or temperature of the battery varies, however, the third area S3 is relatively small, which can effectively prevent an external impact force from acting on the notch groove and prevent the anti-explosion valve from being opened when the battery end cover assembly is bumped by accident, and therefore, the working stability of the anti-explosion valve can be improved.

Optionally, the tensile strength of the anti-explosion valve is 90-130 N/mm². Within the range of the tensile strength, the tolerance pressure which can be borne by the anti-explosion valve is approximately 0.4-0.8 MPa. Therefore, the tensile strength of the anti-explosion valve should not be lower than 90 N/mm², the tolerance pressure which can be borne by the anti-explosion valve is prevented from being far lower than 0.4 MPa, and the situation that the anti-explosion valve is opened due to partial temporary temperature or pressure rise inside the battery is avoided, so that the anti-explosion valve cannot be damaged under reasonable temperature or pressure variation, and the error rate of the anti-explosion valve is reduced. The tensile strength of the anti-explosion valve should not be more than 130 N/mm², and the tolerance pressure which can be borne by the anti-explosion valve is prevented from being far more than 0.8 MPa, so that the situation that the anti-explosion valve is still not opened when there is an explosion rise inside the battery is avoided, and it is ensured that the anti-explosion valve can be opened in time for exhaust. An appropriate tensile strength is selected for the anti-explosion valve, so that the anti-explosion valve is not easily damaged during machining and assembling, and the production defect rate of the battery end cover assembly is reduced.

In some specific embodiments, the contour line on the section, perpendicular to the extension direction of the notch groove, of the notch groove is U-shaped or C-shaped. Compared with a notch groove with a rectangular, trapezoidal or triangular section, the notch groove with the U-shaped or C-shaped section has the advantage that a sharp corner on a contour line of the U-shaped or C-shaped section is avoided, the anti-explosion valve is prevented from generating an overhigh centralized stress on the weakest position, and thus, the probability that the anti-explosion valve is opened when not reaching a set tolerance pressure due to the overhigh centralized stress is reduced. Therefore, by such disposing, the working reliability of the anti-explosion valve can be improved. For the production of the anti-explosion valve, the notch groove is generally formed in a cutting or stamping way. As the contour line on the section, perpendicular to the extension direction of the notch groove, of the notch groove is U-shaped or C-shaped, the design of the sharp corner is avoided, the situation that too many burrs are generated by the sharp corner during machining is avoided, the probability that the sharp corner is torn off by pulling and dragging the burrs during production is avoided, and thus, a tolerance pressure value of the anti-explosion valve is prevented from being reduced.

Optionally, the contour line on the section, perpendicular to the extension direction of the notch groove, of the notch groove includes a circular arc line of which the radius r1 is 0.05-0.15 mm. Therefore, the range of the radius r1 of the circular arc line is limited, which is beneficial to the uniform distribution of internal stresses of the anti-explosion valve on the wall surface of the notch groove along the circular arc line, and greatly reduces a difference of the internal stresses on all positions of the circular arc line. In this way, when the internal pressure or temperature of the battery varies to make the anti-explosion valve deform, the anti-explosion valve on the position of the notch groove is opened due to deformation. At the moment, the opening of the anti-explosion valve on the position of the notch groove is mainly caused by the variation of the internal temperature and pressure, and the influence of the concentrated internal stresses is reduced, and thus, an actual tolerance pressure value of the anti-explosion valve is more accurate.

In some embodiments, the minimum distance between the pressure relief mechanism and each of the terminal assemblies is b2, and b2>b1. By such disposing, the terminal assemblies and other external components connected to the terminal assemblies can be spaced from the pressure relief mechanism by a sufficient distance. After the pressure relief mechanism is opened, the pressure relief mechanism is not easily blocked by the other external components, the probability that the internal gas and the electrolyte are ejected on the terminal assemblies and the other external components when the pressure relief mechanism performs pressure relief can be reduced, and the probability that the other external components catch fire is reduced. Moreover, after the pressure relief mechanism is spaced from the terminal assemblies for a safe distance, the risk of short circuit caused by conducting the positive and negative electrodes of the battery by an ejected material from the pressure relief mechanism is not easily caused, and therefore, the safety of the battery can be improved.

Specifically, 25%≤b1/b2≤35%. By such disposing, the distance between the pressure relief mechanism and each of the terminal assemblies can be long enough, and therefore, the risk that the ejected material from the pressure relief mechanism is ejected to the terminal assemblies is further reduced. Moreover, the pressure relief mechanism and the terminal assemblies are reasonably distributed on the end cover, so that interference generated by disposing the terminal assemblies to be too close to the edge of the end cover is avoided.

In some embodiments, the pressure relief mechanism is located on a geometric center of a figure formed by the outer contour of the end cover. The pressure relief mechanism is disposed on the geometric center of the figure formed by the outer contour of the end cover, the distance from the pressure relief mechanism to each position of the edge of the end cover is relatively short, an exhaust path from the inside of the battery to the pressure relief mechanism is relatively short as a whole, which is beneficial to the improvement of a pressure relief effect, so that the situation of untimely pressure relief caused by an overlong distance between a partial position inside the battery and the pressure relief mechanism is avoided, and the probability of partial explosion caused by untimely pressure relief is reduced.

In some embodiments, the end cover is provided with a liquid injection hole penetrating in the thickness direction thereof. By such disposing, it is convenient to inject a liquid via the liquid injection hole during production, not only is the production flexible, but also the number of times of liquid injection and the liquid injection time can be selected as required. The electrolyte can be replenished in time when being found to be insufficient by detection, so that the reject ratio of the battery is reduced.

Specifically, the liquid injection hole is located between one of the terminal assemblies and the pressure relief mechanism. The minimum distance between the liquid injection hole and the pressure relief mechanism is b3, the minimum distance between the liquid injection hole and one of the terminal assemblies is b4, and 1.5≤b3/b4≤2.

The liquid injection hole is placed between one of the terminal assemblies and the pressure relief mechanism, the position of the liquid injection hole cannot be too close to the edge of the end cover, when a liquid is injected into the liquid injection hole, paths along which the injected electrolyte is infiltrated around approximately differ a little, and the overall flow path of the electrolyte is relatively short, which is beneficial to the overall sufficient infiltration of electrode assemblies in the electrolyte, thereby improving the overall liquid injection effect. By limiting the 1.5≤b3/b4≤2, the liquid injection hole is disposed to be closer to the terminal assembly and is farther away from the pressure relief mechanism. The liquid injection hole and the pressure relief mechanism are both weak areas on the end cover, and therefore, the situation that the end cover is easy to deform and fracture can be avoided by disposing the liquid injection hole to be far away from the pressure relief mechanism. Moreover, the body structures of the terminal assemblies and the other external components connected to the terminal assemblies can both improve the structural strength of the end cover on the terminal assemblies. By disposing the liquid injection hole to be closer to the terminal assembly, the liquid injection hole can be protected by the terminal assemblies and the other external components, the deformation of the end cover on the position of the liquid injection hole when the end cover is impacted by a pressure is reduced, and thus, the overall structural strength is improved.

In some embodiments, the two terminal assemblies are provided and are respectively a positive terminal assembly and a negative terminal assembly, and the pressure relief mechanism is located between the two terminal assemblies. Therefore, positive and negative electrode connection with the other external components (such as a converging member) can be performed on the battery end cover assembly, positive and negative electrodes are centralized on the battery end cover assembly, so that the integration level is high, and the overall wiring and layout of the battery are more compact, which is beneficial to the reduction of the overall volume.

Specifically, the distance between axes of the two terminal assemblies is D1, the minimum distance between the axis of the negative terminal assembly and the outer contour of the end cover is D2, and 5≤D1/D2≤7. After such disposing, the two terminal assemblies can be reasonably distributed in the length direction of the end cover, and the structural strength of the end cover in a central area in the length direction can be appropriately improved, so that the deformation of the end cover in the center is reduced, and the appearance and performance of the battery are improved.

The energy storage apparatus according to an embodiment in a second aspect of the present application includes the battery end cover assembly according to the above-mentioned embodiment.

For the energy storage apparatus according to the embodiment in the second aspect of the present application, by obtaining the battery end cover assembly of which the area is matched with the pressure relief capacity, the smoothness of the anti-explosion pressure relief is guaranteed, meanwhile, the structural strength of the battery end cover assembly is guaranteed, and thus, the use safety of the energy storage apparatus is improved.

The electric device according an embodiment in a third aspect of the present application includes the energy storage apparatus according to the above-mentioned embodiment.

For the electric device according the embodiment in the third aspect of the present application, by obtaining the energy storage apparatus of which the area is matched with the pressure relief capacity, the smoothness of the anti-explosion pressure relief is guaranteed, meanwhile, the structural strength of the battery end cover assembly is guaranteed, and thus, the use safety of the electric device is improved.

Parts of additional aspects and advantages of the present application will be given in the following description, and parts thereof become apparent in the following description or known by practice from the present application.

BRIEF DESCRIPTION OF FIGURES

The above-mentioned and/or additional aspects and advantages of the present application become apparent and understandable in the description for embodiments in conjunction with the following accompanying drawings, in which.

Figure 1:
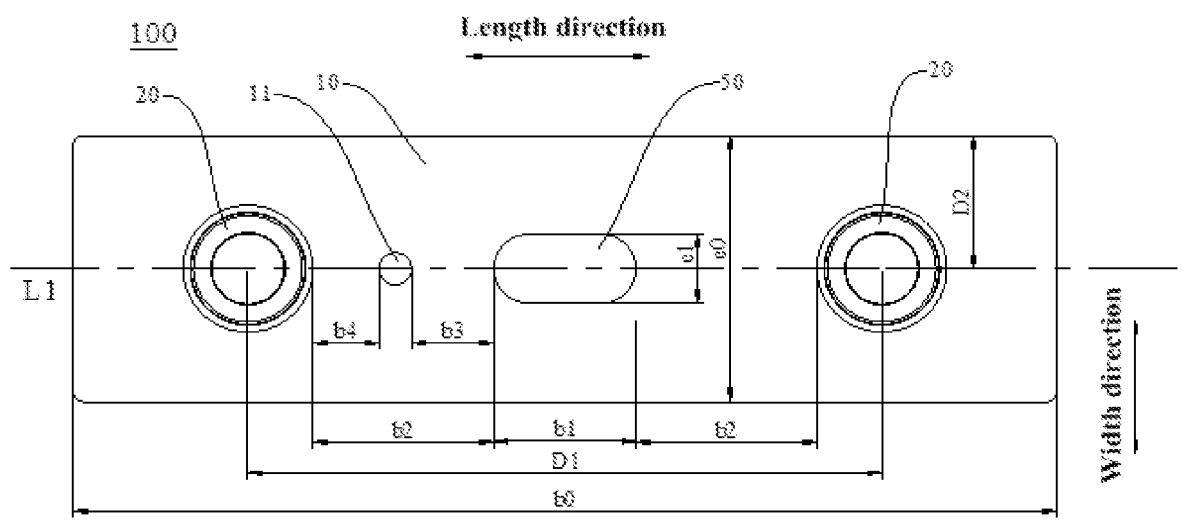
FIG. 1 is a main view of a battery end cover assembly according to some embodiments.

Reference numerals in the accompanying drawings:
01, electric device;
01A, energy storage apparatus;
1000, single battery; 2000, box body; 1000B, battery module; 1000C, battery pack;
100, battery end cover assembly; 200, housing; 200a, opening; 300, electrode assembly;
10, end cover; 101, outer side surface; 102, inner side surface; 11, liquid injection structure; 111, liquid injection hole; 112, sealing nail; 13, terminal leading-out hole; 14, mounting hole; L1, width median line;
20, terminal assembly; 204, electrode terminal; 205, connecting piece;
21, positive terminal assembly; 22, negative terminal assembly;
40, anti-explosion patch;
50, pressure relief mechanism; 51, anti-explosion valve; 511, a preset opening area; 512, predetermined open boundary; 5121, connecting line; 513, notch groove; 5131, first notch segment; 5132, second notch segment; 5133, third notch segment;
60, insulation board; 61, first avoidance hole; 62, second avoidance hole; 63, third avoidance hole.

DETAILED DESCRIPTION

The embodiments of the present application will be described in detail below, and examples of the embodiments are shown in the accompanying drawings, wherein same or similar numerals throughout indicate same or similar elements or elements with same or similar functions. The embodiments described below with reference to the accompanying drawings are exemplary, and are only intended to explain the present application, rather than to be understood as limitations on the present application.

In the description of the present application, it should be noted that directional or positional relationships indicated by terms such as "center", "length", "width", "thickness", "upper", "lower", "front", "rear", "top", "bottom", "inner", "outer", "axial" and "radial" are based on directional or positional relationships as shown in the accompanying drawings, and are only for the purposes of facilitating describing the present application and simplifying the description, rather than indicating or implying that the referred apparatus or element has to have a specific direction or be constructed and operated in the specific direction, and therefore, they cannot be regarded as limitations on the present application. Furthermore, the features defined as "first" and "second" may explicitly or implicitly include one or more of the features. In the description of the present application, "a plurality of" means two or more unless it may be specifically defined otherwise.

In the description of the present application, it should be noted that the terms "mounted", "connected" and "connection" should be understood in a broad sense unless otherwise specified and defined, for example, "connection" may be fixed connection or detachable connection or integrated connection, may be mechanical connection or electric connection, may be direct connection or indirect connection through an intermediate medium, and may be internal connection of two elements. For those of ordinary skill in the art, the specific meanings of the above terms in the present application may be understood according to specific situations.

A battery end cover assembly 100 according to an embodiment of the present application will be described below with reference to the accompanying drawings.

Figure 2:
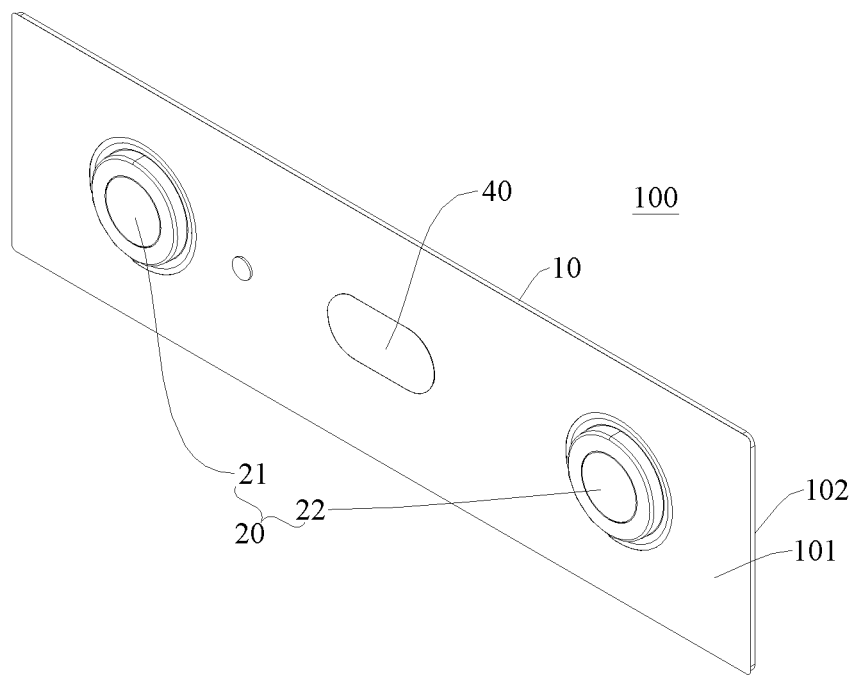
FIG. 2 is a three-dimensional view of a battery end cover assembly according to some embodiments.
Figure 3:
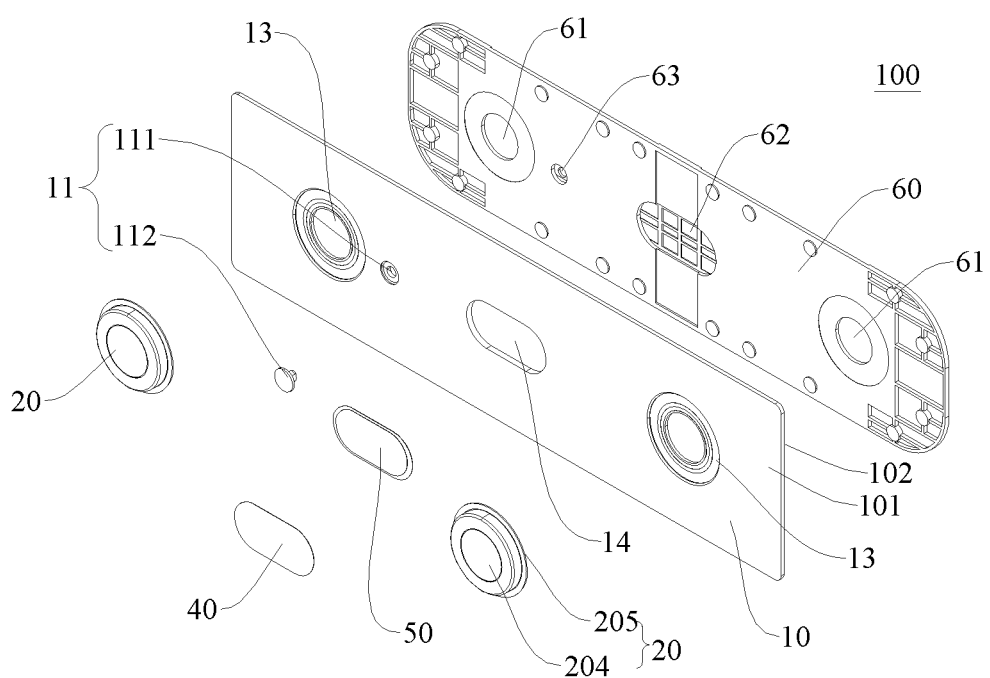
FIG. 3 is an exploded view of a battery end cover assembly according to some embodiments.

With reference to FIG. 1 to FIG. 3, a battery end cover assembly 100 according to an embodiment in a first aspect of the present application includes an end cover 10, terminal assemblies 20 and a pressure relief mechanism 50, and the terminal assemblies 20 and the pressure relief mechanism 50 are both disposed on the end cover 10. The end cover 10 is an end sealing cover of a battery, and the terminal assemblies 20 are used for internal and external electric energy transmission of the battery.

The pressure relief mechanism 50 is a component for relieving an internal pressure of the battery. The pressure relief mechanism 50 is disposed on the end cover 10, and when the internal pressure or temperature of the battery reaches a threshold value, the internal pressure of the battery is relieved by the pressure relief mechanism 50. The pressure relief mechanism 50 may be a component such as an anti-explosion valve 51, an anti-explosion sheet, a pressure relief valve and a one-way valve.

In some embodiments, the end cover 10 is provided with terminal leading-out holes 13 penetrating in the thickness direction thereof, and the terminal assemblies 20 are connected to the end cover 10 and cover the terminal leading-out holes 13. The terminal assemblies 20 cover the terminal leading-out holes 13 to play a role in sealing the terminal leading-out holes 13. Of course, in other embodiments of the present application, it is also possible that the end cover 10 is not provided with the terminal leading-out holes 13, and the terminal assemblies 20 are integrally formed on the end cover 10.

In some embodiments, the pressure relief mechanism 50 is located on a geometric center of a figure formed by an outer contour of the end cover 10. For example, in FIG. 1, the end cover 10 is of a rectangle, and the pressure relief mechanism 50 is located on the intersection point of diagonal lines of the rectangle. Here, the distance from the pressure relief mechanism 50 to each position of the edge of the end cover 10 is relatively balanced, and an exhaust path from the inside of the battery to the pressure relief mechanism 50 is relatively short as a whole, which is beneficial to the improvement of a pressure relief effect, so that the situation of untimely pressure relief caused by an overlong distance between a partial position inside the battery and the pressure relief mechanism 50 is avoided, and the probability of partial explosion caused by untimely pressure relief is reduced. In other embodiments of the present application, it is also possible that the pressure relief mechanism 50 is not disposed in the center of the end cover 10, at the moment, the distance between the pressure relief mechanism 50 and the edge of the end cover 10 is also required to be reasonably set.

The area of the figure formed by the outer contour of the end cover 10 is a first area S1, the area of a projection of the pressure relief mechanism 50 on the end cover 10 is a second area S2, and the second area S2 accounts for 0.5% to 5% of the first area S1. With a solution as shown in FIG. 1 as an example, the end cover 10 is of a rectangle, the length of the end cover 10 is b0, the width of the end cover 10 is e0, and the first area S1 of the outer contour of the end cover 10 is expressed as S1=b0×e0. The projection of the pressure relief mechanism 50 on the end cover 10 is of a runway shape including a rectangle in the middle and semicircles on two ends and having the length b1 and the width e1, and the second area S2 of the runway shape is expressed as S2= (b1−e1)×e1+π×(e1÷2)². At the moment, the second area S2 is controlled to be 0.5% to 5% of the first area S1.

It can be understood that the pressure relief mechanism 50 is a weak area on the battery end cover assembly 100, the pressure relief mechanism 50 is provided with a thin wall (or a structure such as a notch or a flexible membrane), when the internal pressure of temperature of the battery reaches the threshold value, the thin wall (or the structure such as the notch or the flexible membrane) is opened or torn off to release the internal pressure, and thus, the battery is prevented from being exploded or fractured. Therefore, the area of the pressure relief mechanism 50 on the end cover 10 not only can determine the pressure relief capacity, but also can affect the overall structural strength of the battery end cover assembly 100.

In the present application, by limiting the proportion of the second area S2 to the first area S1 to be not less than 0.5%, the area taken up by the pressure relief mechanism 50 cannot be too small, there is a pressure relief opening large enough for exhaust after the pressure relief mechanism 50 is opened, so that the size of the battery end cover assembly 100 is relatively matched with the pressure relief capacity. In this way, the probability of untimely pressure relief is reduced, and the safety of a battery is improved.

In the present application, by limiting the proportion of the second area S2 to the first area S1 to be not more than 5%, the area taken up by the pressure relief mechanism 50 cannot be too large, in this way, the overall structural strength of the battery end cover assembly 100 can be guaranteed, and the battery end cover assembly is not easy to deform after bearing a pressure. Moreover, after the area taken up by the pressure relief mechanism 50 is reduced, the edge, on the pressure relief mechanism 50, of the end cover 10 is also not easy to deform, so that the probability that the pressure relief mechanism 50 falls off to be invalid is reduced, and the reliability of the overall battery can be improved.

Optionally, the proportion of the second area S2 to the first area S1 may be 0.8%, 1.0%, 1.2%, 1.3%, 1.5%, 1.7%, 2.1%, 2.3%, 2.5%, 2.8%, 3.0%, 3.4%, 3.7%, 3.9%, 4.1%, 4.3%, 4.5%, 4.8% and 5.0%.

With reference to FIG. 1, a battery end cover assembly 100 according to an embodiment of the present application includes an end cover 10, terminal assemblies 20 and a pressure relief mechanism 50, and the terminal assemblies 20 and the pressure relief mechanism 50 are both disposed on the end cover 10. The pressure relief mechanism 50 and the terminal assemblies 20 are distributed at intervals in the length direction of the end cover 10. The size of the pressure relief mechanism 50 in the length direction of the end cover 10 is b1 which is referred to as the length of the pressure relief mechanism 50, and the length b1 of the pressure relief mechanism 50 accounts for 5% to 12% of the length b0 of the end cover 10. The size of the pressure relief mechanism 50 in the width direction of the end cover 10 is e1 which is referred to as the width of the pressure relief mechanism 50, and the width e1 of the pressure relief mechanism 50 accounts for 15% to 25% of the width e0 of the end cover 10.

It can be understood that the pressure relief mechanism 50 is a weak area on the battery end cover assembly 100, the pressure relief mechanism 50 may be extruded when the internal pressure of the battery is overhigh, and thus, the battery end cover assembly 100 deforms to a certain extent.

The pressure relief mechanism 50 is spaced from the terminal assemblies 20 in the length direction of the end cover 10. On one hand, the terminal assemblies 20 can keep away from the pressure relief mechanism 50, the centralized stresses on the terminal assemblies 20 are relatively small when the internal pressure of the battery is relatively high, and thus, loss, connection falling off, etc. caused by overhigh pressure borne by the terminal assemblies 20 are avoided. On the other hand, the length size of the end cover 10 can be utilized, and the pressure relief mechanism 50 may be spaced from the terminal assemblies 20 for a certain distance, so that mutual interference and influences to each other are avoided.

By controlling the proportion of the length b1 of the pressure relief mechanism 50 to the length b0 of the end cover 10 to be at least 5%, and controlling the proportion of the width e1 of the pressure relief mechanism 50 to the width e0 of the end cover 10 to be at least 15%, the pressure relief mechanism 50 can take up an area large enough for pressure relief and exhaust, thereby guaranteeing the smoothness of exhaust.

By controlling the proportion of the length b1 of the pressure relief mechanism 50 to the length b0 of the end cover 10 to be not more than 12%, a distance which is long enough can be reserved between two sides, located on the pressure relief mechanism 50, of the end cover 10 to place structures such as the terminal assemblies 20. By controlling the proportion of the width e1 of the pressure relief mechanism 50 to the width e0 of the end cover 10 to be not more than 25%, the probability that the side, located on the pressure relief mechanism 50, of the end cover 10 is too narrow to be easily fractured is reduced. By controlling the length and width of the pressure relief mechanism 50, the structural strength of the end cover 10 can be guaranteed while the pressure relief capacity can be guaranteed, and the situation that the end cover 10 is bent and fractured when bearing an impact and a pressure is avoided.

After the length b1 of the pressure relief mechanism 50 is limited, a certain space may be vacated on the end cover 10 to place the terminal assemblies 20, so that mounting inconvenience and even mutual interference caused by disposing the pressure relief mechanism 50 to be too close to the terminal assemblies 20 are avoided. Furthermore, the length b1 of the pressure relief mechanism 50 is limited to avoid excessive deformation caused by an overlarge bending moment borne due to the overlarge length of the pressure relief mechanism 50, so that the situation that the pressure relief mechanism 50 is easy to fall off due to the excessive deformation is avoided, in this way, the problems that the exhaust direction cannot be limited and the exhaust is obstructed by the separated pressure relief mechanism 50 due to the fact that the pressure relief mechanism 50 is ejected away from the end cover 10 by a high-pressure gas at high pressure are also avoided.

In some embodiments, the proportion of the area of the pressure relief mechanism 50 to the area of the end cover 10 (i.e. the proportion of the second area S2 to the first area S1) is 0.5% to 5%, the proportion of the length of the pressure relief mechanism 50 to the length of the end cover 10 (i.e. the proportion of the length b1 to the length b0) is 5% to 12%, and the proportion of the width of the pressure relief mechanism 50 to the width of the end cover 10 (i.e. the proportion of the width e1 to the width e0) is 15% to 25%, so that the pressure relief mechanism 50 can take up an area large enough for pressure relief and exhaust, thereby guaranteeing smooth and timely exhaust. Meanwhile, each side, located on the pressure relief mechanism 50, of the end cover 10 does not have to be set to be too narrow, so that the risk that the edge of the end cover 10 is easily fractured due to the overlarge length and width of the pressure relief mechanism 50 is avoided, and the situation that the end cover 10 is bent and fractured when bearing an impact and a pressure is avoided. Moreover, there is a sufficient space for arranging components on the end cover 10 so that all the components can be spaced without mutual interference. Furthermore, the structural strength of the end cover 10 can be guaranteed, excessive deformation caused when the end cover 10 bears a pressure is avoided, the probability that a gas is exhausted from the edge of the end cover 10 when the internal temperature or pressure of the battery is overhigh is avoided, it is ensured that the gas is only exhausted from the pressure relief mechanism 50, the exhaust direction of the gas in the battery can be effectively controlled, it is convenient to perform subsequent treatment on exhausted electrolyte or high-temperature gas, and unwanted corrosion, fire hazards, etc. caused by arbitrary emission of the electrolyte or high-temperature gas in the battery are avoided.

Optionally, the proportion of the length b1 of the pressure relief mechanism 50 to the length b0 of the end cover 10 is 5%, 7%, 9%, 10%, 11.5%, 12%, etc.

Optionally, the proportion of the width e1 of the pressure relief mechanism 50 to the width e0 of the end cover 10 is 15%, 17%, 19%, 20%, 21.5%, 22.4%, 23.7%, 24.8%, 25%, etc.

A battery end cover assembly 100 according to an embodiment of the present application includes an end cover 10, terminal assemblies 20 and a pressure relief mechanism 50, and the terminal assemblies 20 and the pressure relief mechanism 50 are both disposed on the end cover 10. As shown in FIG. 1, the size of the pressure relief mechanism 50 in the length direction of the end cover 10 is b1, the minimum distance between the pressure relief mechanism 50 and each of the terminal assemblies 20 is b2, and b2>b1. By such disposing, the terminal assemblies 20 and other external components connected to the terminal assemblies 20 can be spaced from the pressure relief mechanism 50 by a sufficient distance. After the pressure relief mechanism 50 is opened, the pressure relief mechanism 50 is not easily blocked by the other external components, the probability that the internal gas and the electrolyte are ejected on the terminal assemblies 20 and the other external components when the pressure relief mechanism 50 performs pressure relief can be reduced, and the probability that the other external components catch fire is reduced. Moreover, after the pressure relief mechanism 50 is spaced from the terminal assemblies 20 for a safe distance, the risk of short circuit caused by conducting the positive and negative electrodes of the battery by an ejected material from the pressure relief mechanism 50 is not easily caused, and therefore, the safety of the battery can be improved.

Optionally, the minimum distance between the pressure relief mechanism 50 and each of the terminal assemblies 20 is b2, the length of the pressure relief mechanism 50 is b1, and $25\% \leq b1/b2 \leq 35\%$. By such disposing, the distance between the pressure relief mechanism 50 and each of the terminal assemblies 20 can be long enough, and therefore, the risk that the ejected material from the pressure relief mechanism 50 is ejected to the terminal assemblies 20 is further reduced. Moreover, the pressure relief mechanism 50 and the terminal assemblies 20 are reasonably distributed on the end cover 10, so that interference generated by disposing the terminal assemblies 20 to be too close to the edge of the end cover 10 is avoided.

The terminal assemblies 20 are closer to the edge of the end cover 10 with respect to the pressure relief mechanism 50. As the edge of the end cover 10 is supported, the structural strength on the positions of the terminal assemblies 20 can be improved by virtue of the support borne by the edge of the end cover 10, pressures borne on the terminal assemblies 20 when the battery end cover assembly 10 bears a pressure can be reduced, and the probability that the terminal assemblies 20 are damaged to fall off can be reduced.

Further, optionally, b1/b2 may be 25%, 27.1%, 29.6%, 31.2%, 33.1%, 34.5%, 35%, etc.

Figure 4:
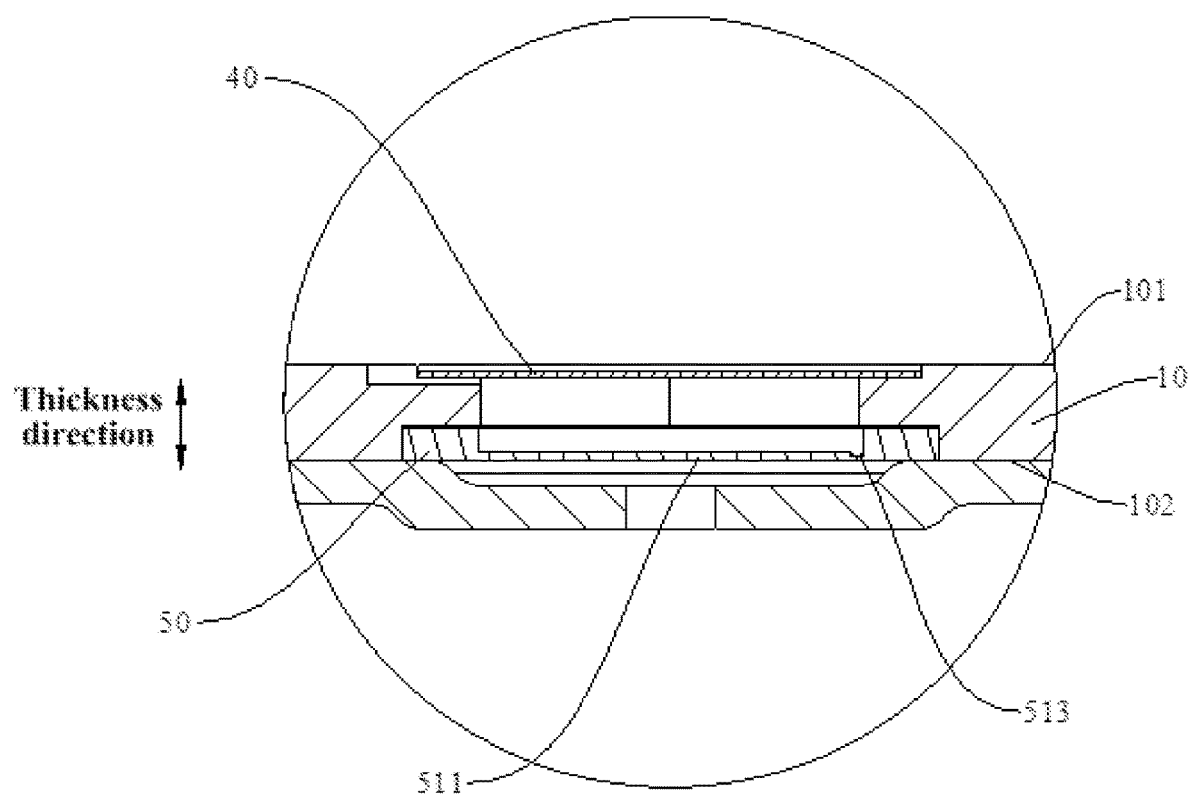
FIG. 4 is a partial sectional view of a battery end cover assembly according to some other embodiments.
Figure 5:
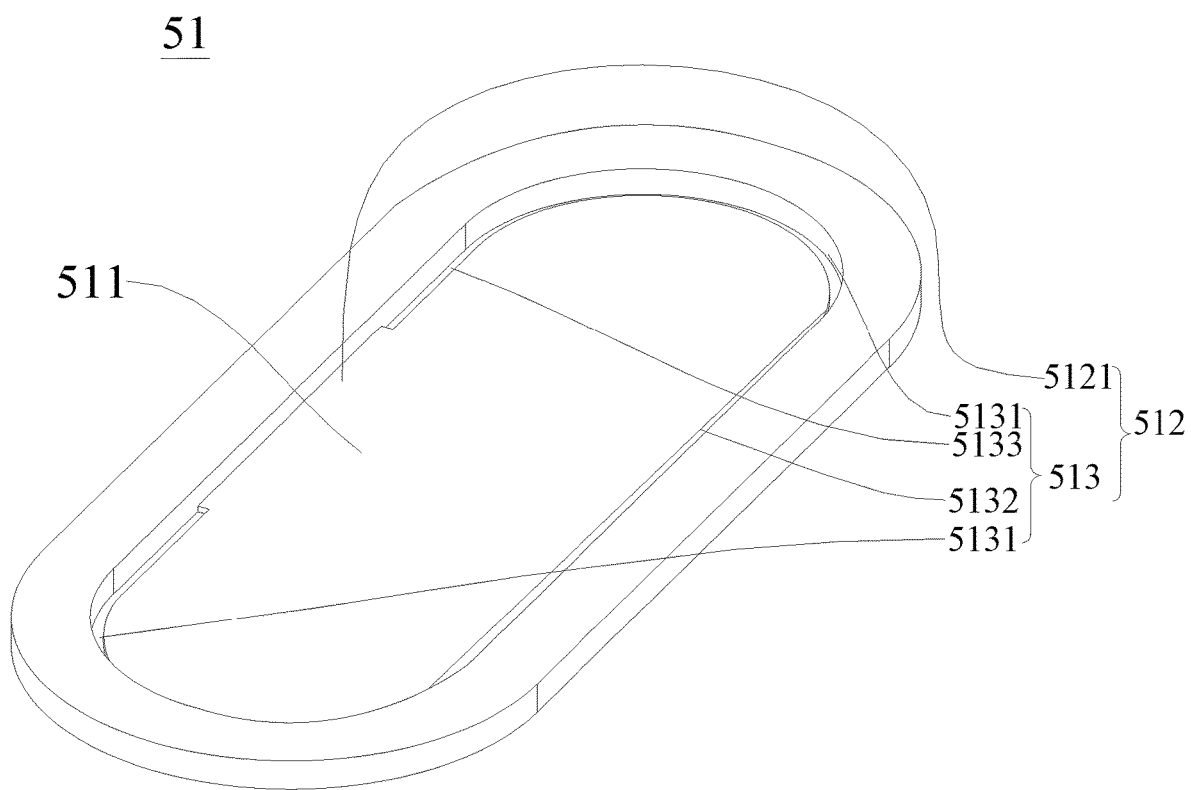
FIG. 5 is a three-dimensional view of an anti-explosion valve according to some embodiments.

With reference to FIG. 1, a battery end cover assembly 100 according to an embodiment of the present application includes an end cover 10, terminal assemblies 20 and a pressure relief mechanism 50, and the terminal assemblies 20 and the pressure relief mechanism 50 are both disposed on the end cover 10. As shown in FIG. 4 and FIG. 5, the pressure relief mechanism 50 includes an anti-explosion valve 51, and the anti-explosion valve 51 includes a preset opening area 511. For facilitating description, here, the outer edge of the preset opening area 511 is referred to as a predetermined open boundary 512.

The preset opening area 511 is an area reserved for pressure relief when the anti-explosion valve 51 is designed. If pressure relief is required when the internal temperature or pressure of the battery is increased, the preset opening area 511 is opened, so that a pressure relief opening is formed in the anti-explosion valve 51, and the gas in the battery is exhausted from the pressure relief opening formed after the preset opening area 511 is opened. The predetermined open boundary 512 is an edge contour of the pressure relief opening formed after the preset opening area 511 is opened.

Specifically, the area of the preset opening area 511 accounts for at least a half of the area of the anti-explosion valve 51 (i.e. the second area S2), and after the preset opening area 511 is opened, the pressure relief opening large enough is obtained for exhaust. The area of the preset opening area 511 is reasonably set, and thus, the pressure relief capacity of the anti-explosion valve 51 can be guaranteed.

Further, the proportion of the area of the preset opening area 511 to the area of the anti-explosion valve 51 is not more than 95%, and an edge large enough is reserved for fixing or connecting the anti-explosion valve 51, so that the anti-explosion valve 51 is not easy to fall off, and the working reliability of the anti-explosion valve 51 is improved.

The anti-explosion valve 51 is adopted for pressure relief, compared with a component such as a pressure relief valve and a one-way valve, the anti-explosion valve 51 is relatively thin, it is unnecessary to vacate overmuch space for the pressure relief mechanism 50, which is beneficial to the improvement of the arrangement intensity of an internal structure of the battery, thereby being beneficial to the increment of the energy density of the battery. Moreover, after the internal structure of the battery is tightly arranged, the structural strength is also favorably improved. Moreover, in parts of embodiments, an inner side surface 102 (the surface, facing to the inside of the battery, of the end cover 10) of the end cover 10 is connected with an insulation board 60 which does not need to vacate overmuch space in correspondence to the anti-explosion valve 51, in this way, the insulation board 60 can provide a greater supporting effect for the end cover 10 to reduce the deformation level after the battery end cover assembly 100 bears a pressure.

In some embodiments, the tensile strength of the anti-explosion valve 51 is 90-130 N/mm$^2$, in this way, the situation that the anti-explosion valve 51 is opened when the internal pressure or temperature does not reach a threshold value due to instable performance caused by overlow tensile strength is avoided, and the situation that untimely exhaust caused by difficulty in opening the anti-explosion valve 51 due to overhigh tensile strength is also avoided. Therefore, the reasonable setting of the tensile strength of the anti-explosion valve 51 is beneficial to the improvement of the performance playing reliability and stability.

Specifically, within the range of the tensile strength 90-130 N/mm$^2$ of the anti-explosion valve 51, the tolerance pressure which can be borne by the anti-explosion valve 51 is approximately 0.4-0.8 MPa. Therefore, the tensile strength of the anti-explosion valve 51 should not be lower than 90 N/mm$^2$, the tolerance pressure which can be borne by the anti-explosion valve 51 is prevented from being far lower than 0.4 MPa, and the situation that the anti-explosion valve 51 is opened due to partial temporary temperature or pressure rise inside the battery is avoided, so that the anti-explosion valve 51 cannot be damaged under reasonable temperature or pressure variation, and the error rate of the anti-explosion valve 51 is reduced. The tensile strength of the anti-explosion valve 51 should not be more than 130 N/mm$^2$, and the tolerance pressure which can be borne by the anti-explosion valve 51 is prevented from being far more than 0.8 MPa, so that the situation that the anti-explosion valve 51 is still not opened when there is an explosion risk inside the battery is avoided, and it is ensured that the anti-explosion valve 51 can be opened in time for exhaust. An appropriate tensile strength is selected for the anti-explosion valve 51, so that the anti-explosion valve 51 is not easily damaged during machining and assembling, and the production defect rate of the battery end cover assembly is reduced.

Optionally, the tensile strength of the anti-explosion valve 51 is 90, 95, 100, 103, 108, 112, 116, 121, 128, 130, etc. (unit: N/mm$^2$). Further, optionally, the tensile strength of the anti-explosion valve 51 is 110 N/mm$^2$.

Figure 6:
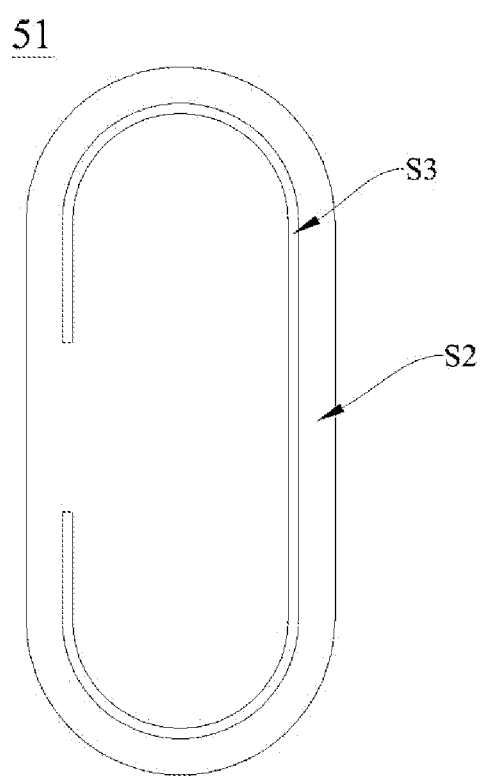
FIG. 6 is a schematic view showing positions of an anti-explosion valve and a notch groove therein according to some embodiments.

In some embodiments, as shown in FIG. 4 to FIG. 6, the anti-explosion valve 51 is provided with a notch groove 513, and the anti-explosion valve 51 on the position of the notch groove 513 is the thinnest, which is beneficial to the timely pressure relief and exhaust. Of course, solutions of the present application are not limited thereto, the preset opening area 511 can also be set to be of a thin wall as a whole, and any part of the thin wall can be torn off when being impacted by a pressure.

Figure 7:
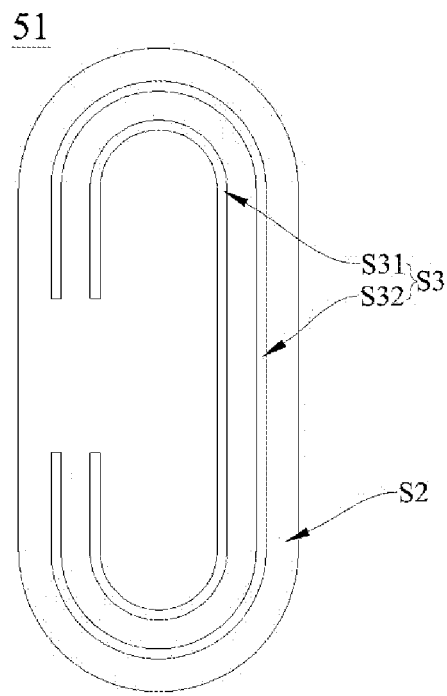
FIG. 7 is a schematic view showing positions of an anti-explosion valve and a notch groove therein according to some other embodiments.

In a solution of the present application, there are one or more notch grooves 513 in the anti-explosion valve 51. When there are a plurality of notch grooves 513 in the anti-explosion valve 51, the plurality of notch grooves 513 can be at least partially connected, or the plurality of notch grooves 513 can be disposed at intervals, which is not limited herein. In an example as shown in FIG. 6, the anti-explosion valve 51 is provided with a C-shaped notch groove 513. In an example as shown in FIG. 7, the anti-explosion valve 51 is provided with two C-shaped notch grooves 513 disposed at intervals. The shape of each notch groove 513 may also be referred to as a runway shape, and such an anti-explosion valve 51 in FIG. 7 may also be referred to as a double-runway-shaped anti-explosion valve. In some further examples, the anti-explosion valve 51 is provided with two C-shaped notch grooves 513 disposed symmetrically, and such an anti-explosion valve 51 may also be referred to as a double-C-shaped anti-explosion valve.

Figure 8:
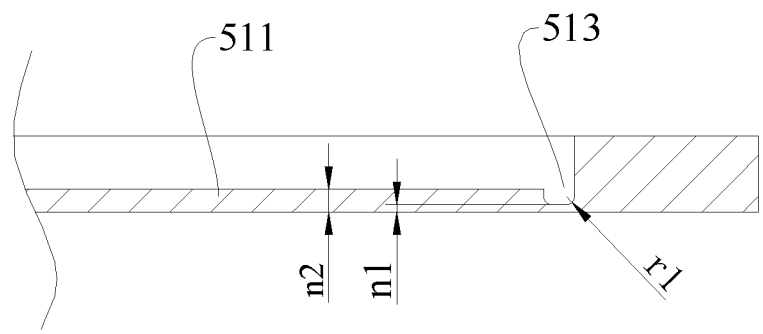
FIG. 8 is a sectional view of an anti-explosion valve according to some embodiments.
Figure 9:
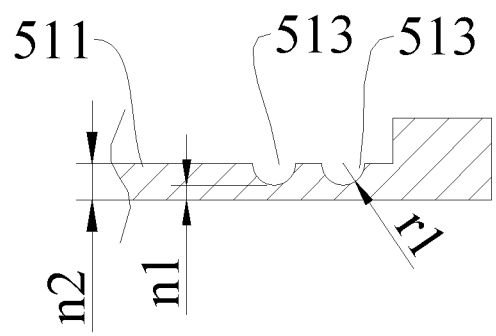
FIG. 9 is a sectional view of an anti-explosion valve according to some other embodiments.

In some embodiments, as shown in FIG. 8 and FIG. 9, the minimum thickness of the anti-explosion valve 51 on the position of the notch groove 513 is a first thickness n1, the thickness of the anti-explosion valve on the position of the preset opening area 511 is n2, and n1 accounts for 15% to 25% of n2. Here, the thickness proportions of the anti-explosion valve 51 on the positions of the notch groove 513 and the preset opening area 511 are limited, so that the preset opening area 511 cannot to be too thick while the anti-explosion valve 51 on the position of the notch groove 513 is relatively thin. The anti-explosion valve 51 on the position of the notch groove 513 is relatively thin, so that the anti-explosion valve 51 on the position of the notch groove 513 can be opened in time when an internal pressure or temperature of the battery reaches a threshold value. The preset opening area 511 cannot be too thick, so that the preset opening area 511 is easily impacted by the high-pressure gas after the position of the notch groove 513 is opened, and the pressure relief opening can be completely opened for smooth exhaust. By limiting the thickness of the anti-explosion valve 51 on the position of the preset opening area 511 to be at least four times as large as the thickness of that on the position of the notch groove 513, when the anti-explosion valve 51 is impacted by the internal pressure or is overhigh in temperature, the pressure can be centralized on the position of the notch groove 513, and the position, where the pressure is centralized on the position of the notch groove 513, of the anti-explosion valve 51 is opened, so that more timely exhaust is achieved, and the working sensitivity of the anti-explosion valve 51 is favorably improved.

Optionally, the ratio of n1 to n2 may be 15%, 17%, 20%, 23%, 25%, etc.

In some embodiments, as shown in FIG. 6 and FIG. 7, the area of a projection of the notch groove 513 on the end cover 10 is a third area S3, and the third area S3 accounts for 1.0% to 1.5% of the second area S2. The second area S2 is the area of a projection of the anti-explosion valve 51 on the end cover 10.

In a solution as shown in FIG. 6, the projection of the anti-explosion valve 51 on the end cover 10 is of a runway shape, and the area taken up by the runway shape is the second area S2. A projection of the notch groove 513 on the end cover 10 is of a C-shaped strip in a dash area in FIG. 6, and the area of this dash area is the third area S3. Moreover, in a solution as shown in FIG. 7, the projection of the anti-explosion valve 51 on the end cover 10 is of a runway shape, and the area taken up by the runway shape is the second area S2. There are two notch grooves 513, projections on the end cover 10 are of two C-shaped strips shown as dash areas in FIG. 7, areas of the two C-shaped strips are respectively S31 and S32, and the area of the dash area is expressed as S3=S31+S32.

Here, the third area S3 is limited to account for 1.0% to 1.5% of the second area S2, that is, the area taken up on the anti-explosion valve 51 by the thinnest area on the anti-explosion valve 51 is limited. The proportion of the third area S3 to the second area S2 cannot be too small, there may be more areas on the position of the notch groove 513 to induce pressure or temperature variation when the internal pressure or temperature of the battery reaches the threshold value, so that the anti-explosion valve can be opened in time for pressure relief, and then, the working sensitivity of the anti-explosion valve 51 can be improved.

The limitation for the proportion of the third area S3 to the second area S2 does not affect the timely opening of the anti-explosion valve 51 when the internal pressure or temperature of the battery varies, however, the third area S3 is relatively small, which can effectively prevent an external impact force from acting on the notch groove 513 and prevent the anti-explosion valve 51 from being opened when the battery end cover assembly 100 is bumped by accident, and therefore, the working stability of the anti-explosion valve 51 can be improved.

When the pressure relief mechanism 50 is located on a geometric center of a figure formed by the outer contour of the end cover 10 and the internal pressure or temperature of the battery is overhigh, the end cover 10 may deform, the geometric center of the end cover 10 is away from the edge of the end cover 10 to generate relatively high deformation, so that the anti-explosion valve 51 can induce deformation variation caused by the variation of the internal pressure in time, and the notch groove 513 in the anti-explosion valve 51 can be rapidly opened for exhaust in time.

Optionally, the proportion of the third area S3 to the second area S2 may be 1.0%, 1.1%, 1.2%, 1.3%, 1.4%, 1.5%, etc.

In some specific embodiments, the notch groove 513 is located in the preset opening area 511. In some optional embodiments, the notch groove 513 is located in a predetermined open boundary 512, that is, the notch groove 513 is disposed along the predetermined open boundary 512. For example, when the predetermined open boundary 512 is a rectangular line, a rectangular area defined by the predetermined open boundary 512 is the preset opening area 511, and the notch groove 513 is disposed along the rectangular line. When bearing a pressure, the anti-explosion valve 51 on the position of the notch groove 513 is fractured, and thus, a rectangular pressure relief opening can be formed. At the moment, the torn-off preset opening area 511 can be completely separated from the remaining parts of the anti-explosion valve 51 and can also be connected, on one side, to the remaining parts.

In some other optional embodiments, the notch groove 513 does not have to be disposed along the predetermined open boundary 512. For example, when the predetermined open boundary 512 is the rectangular line, the rectangular area defined by the predetermined open boundary 512 is the preset opening area 511, and the notch groove 513 is disposed along diagonal lines of the preset opening area 511. When bearing a pressure, the anti-explosion valve 51 on the position of the notch groove 513 is fractured, the preset opening area 511 can be torn off along the diagonal lines to form four triangular areas. After the preset opening area 511 is opened, the formed pressure relief opening is rectangular.

Optionally, segments of the notch groove 513 can be partially disposed along the predetermined open boundary 512 and partially located in the preset opening area 511. Therefore, the shape of the notch groove 513 is flexibly set.

With a solution as shown in FIG. 5 as an example, the notch groove 513 includes two first notch segments 5131 oppositely disposed and arc-shaped, a linear second notch segment 5132 and two third notch segments 5133 disposed at intervals and linear, wherein the second notch segment 5132 is disposed in parallel to the third notch segments 5133, two ends of the second notch segment 5132 are respectively connected to the two first notch segments 5131, and each of the third notch segments 5133 is connected to the corresponding first notch segment 5131. The first notch segments 5131, the second notch segment 5132 and the third notch segments 5133 are located on the predetermined open boundary 512, and the part, located between the two third notch segments 5133, of the predetermined open boundary 512 is a connecting line 5121.

In other words, the second notch segment 5132 is connected to one end of each of the two first notch segments 5131, the other end of each of the two first notch segments 5131 is connected to one of the third notch segments 5133, and the two third notch segments 5133 are disposed at intervals. The part located between the two third notch segments 5133 is the connecting line 5121, and the outer edges of orthographic projections of the connecting line 5121 and the notch groove 513 jointly form the predetermined open boundary 512.

After such disposing, when being opened, the preset opening area 511 can be kept connected on the part on the connecting line 5121, so that the situation that the preset opening area 511 is completely separated from the remaining parts after being opened is avoided. Particularly, when pressure relief is needed, the preset opening area 511 may be adhered with electrolyte, etc. and even catches fire in case that an accident occurs; and by connecting the preset opening area 511 to the end cover 10, the burning preset opening area 511 is prevented from being ejected out, and the probability that the fire spreads outwards is reduced.

In some embodiments, as shown in FIG. 4, the anti-explosion valve 51 is provided with a notch groove 513. As shown in FIG. 8 and FIG. 9, the minimum thickness of the anti-explosion valve 51 on the position of the notch groove 513 is a first thickness n1 which is 0.04-0.06 mm. By such disposing, the sensitivity of the anti-explosion valve 51 can be further improved, and the safety is improved. After the range of the first thickness n1 is limited here, the anti-explosion valve 51 can be limited to have an appropriate tolerance pressure value and can be opened for exhaust in time when the internal temperature or pressure of the battery is overhigh. The range of a radius r1 of a circular arc line is limited, which is beneficial to the uniform distribution of internal stresses of the anti-explosion valve 51 on the wall surface of the notch groove 513 along the circular arc line, and greatly reduces a difference of the internal stresses on all positions of the circular arc line. In this way, when the internal pressure or temperature of the battery varies to make the anti-explosion valve 51 deform, the anti-explosion valve 51 is opened in the notch groove 513 due to deformation. At the moment, the fracture of the anti-explosion valve 51 in the notch groove 513 is mainly caused by bearing the variation of the internal temperature and pressure, the influences from the centralized internal stresses are reduced, and thus, an actual tolerance pressure value of the anti-explosion valve 51 is more accurate.

Specifically, the tensile strength of the anti-explosion valve 51 is 90-130 N/mm$^2$, and the first thickness n1 of which is 0.04-0.06 mm, so that the exhaust pressure of the anti-explosion valve 51 to the battery can reach an appropriate threshold value.

In some embodiments, as shown in FIG. 4, the anti-explosion valve 51 is provided with a notch groove 513. As shown in FIG. 8 and FIG. 9, a contour line on a section, perpendicular to the extension direction of the notch groove 513, of the notch groove 513 is U-shaped or C-shaped. Of course, some solutions in which the contour line on the section, perpendicular to the extension direction of the notch groove 513, of the notch groove 513 is rectangular or triangular or polygonal are not excluded in solutions of the present application. However, comparatively, by adopting the U-shaped or C-shaped section, sharp corners on the contour of the notch groove 513 are reduced, the situation that the anti-explosion valve 51 generates overhigh centralized stresses on the weakest position is avoided, and thus, the probability that the anti-explosion valve 51 is opened on the position of a sharp corner due to overhigh centralized internal stresses is avoided. Therefore, by such disposing, the working reliability of the anti-explosion valve 51 can be improved.

For the production of the anti-explosion valve 51, the notch groove 513 is generally formed in a cutting or stamping way. As the contour line on the section, perpendicular to the extension direction of the notch groove 513, of the notch groove 513 is U-shaped or C-shaped, the design of the sharp corner is avoided, the situation that too many burrs are generated by the sharp corner during machining is avoided, the probability that the sharp corner is torn off by pulling and dragging the burrs during production is avoided, and thus, a tolerance pressure value of the anti-explosion valve 51 is prevented from being reduced.

Specifically, the contour line on the section, perpendicular to the extension direction of the notch groove 513, of the notch groove 513 includes a circular arc line of which the radius r1 is 0.05-0.15 mm. Here, the radius r1 of the circular arc line is limited to be at least 0.05 mm, therefore, on one hand, it is easy to machine the circular arc contour, and on the other hand, centralized stresses generated here are effectively reduced. The radius r1 of the circular arc line is limited to be not greater than 0.15 mm, so that the depth of the notch groove 513 and the minimum thickness of the anti-explosion valve 51 on the position of the notch groove 513 can be reasonably distributed.

Optionally, the radius r1 of the circular arc line may be 0.05, 0.07, 0.09, 0.10, 0.12, 0.13, 0.15 mm, etc.

Specifically, the minimum thickness of the anti-explosion valve 51 on the position of the notch groove 513 is a first thickness n1 which is 0.04-0.06 mm. The contour line on the section, perpendicular to the extension direction of the notch groove 513, of the notch groove 513 includes the circular arc line of which the radius r1 is 0.05-0.15 mm, which is beneficial to the implementation that the exhaust pressure of the anti-explosion valve 51 reaches an exhaust pressure or temperature threshold value required by the battery.

In a solution of the present application, the anti-explosion valve 51 is relatively flexible in disposing way, for example, the anti-explosion valve 51 can be integrally formed on the end cover 10. For example, the notch groove 513 is stamped in the end cover 10 to facilitate pressure relief of the end cover 10 here, and thus, the anti-explosion valve 51 is formed. In such a way, during machining, the battery end cover assembly 100 has a small number of parts, so that the production efficiency is higher.

For another example, as shown in FIG. 3 and FIG. 4, the end cover 10 is provided with a mounting hole 14, and the anti-explosion valve 51 is connected to the end cover 10 and covers the mounting hole 14. Comparatively, such a structure has the advantage that the size of the anti-explosion valve 51 is relatively flexibly selected, an anti-explosion valve 51 with an appropriate thickness can be selected as required, thereby obtaining more suitable pressure relief capacity.

In some embodiments, as shown in FIG. 3, the battery end cover assembly 100 further includes an anti-explosion patch 40 attached to an outer side surface of the end cover 10 and covering the pressure relief mechanism 50.

The anti-explosion patch 40 can be constructed as an insulating part and has a certain structural strength. By disposing the anti-explosion patch 40, the leakage of the pressure relief mechanism 50 can be reduced. Moreover, by observing whether the anti-explosion patch 40 swells, it can be rapidly detected whether the pressure relief mechanism 50 is in an exhaust state. Or by observing whether the anti-explosion patch 40 swells when being not used normally, it is detected whether the pressure relief mechanism 50 is invalid.

With reference to FIG. 1 to FIG. 3, a battery end cover assembly 100 according to an embodiment of the present application includes an end cover 10 and a liquid injection structure 11 disposed on the end cover 10. The end cover 10 is an end sealing cover of a battery, the end cover 10 is provided with the liquid injection structure 11 by which an electrolyte can be injected into the battery, and after the electrolyte is injected, the end cover 10 is sealed by the liquid injection structure 11.

In some embodiments, as shown in FIG. 3, the end cover 10 is provided with a liquid injection hole 111 penetrating in the thickness direction thereof. The battery end cover assembly 100 further includes a sealing nail 112 connected to the end cover 10 and covering the liquid injection hole 111. By such disposing, it is convenient to inject a liquid via the liquid injection hole 111 during production, not only is the production flexible, but also the number of times of liquid injection and the liquid injection time can be selected as required. The electrolyte can be replenished in time when being found to be insufficient by detection, so that the reject ratio of the battery is reduced. When the production is completed, sealing is performed by using the sealing nail 112, so that the sealing property is improved.

Specifically, a figured formed by an outer contour of the end cover 10 has a width median line L1, and distances from the width median line L1 to two opposite sides of the end cover 10 are the same. The liquid injection hole 111 is located in the width median line L1. By such disposing, when the liquid is injected into the liquid injection hole 111, paths along which the injected electrolyte is infiltrated to two sides are approximately consistent, and the overall flow path of the electrolyte is relatively short, which is beneficial to the sufficient infiltration of electrode assemblies 300 on two sides in the electrolyte, thereby improving the overall liquid injection effect.

Further, as shown in FIG. 1, the liquid injection hole 111 is located between one of the terminal assemblies 20 and the pressure relief mechanism 50. Here, the position of the liquid injection hole 111 cannot be excessively deviated, and it is convenient to rapidly disperse the electrolyte to flow during liquid injection.

Optionally, the minimum distance between the liquid injection hole 111 and the pressure relief mechanism 50 is b3, the minimum distance between the liquid injection hole 111 and each of the terminal assemblies 20 is b4, and $1.5 \leq b3/b4 \leq 2$. It can be understood that the end cover 10 on the position of the liquid injection hole 111 is relatively weak in structure; and by disposing the liquid injection hole 111 to be closer to the terminal assembly 20 and farther from the pressure relief mechanism 50, on one hand, the situation that the liquid injection hole 111 is disposed to be too close to make the end cover 10 easy to deform here is avoided, on the other hand, the liquid injection hole 111 is protected to a certain extent by virtue of the structural strength of the terminal assembly 20, the deformation of the end cover 10 on the position of the liquid injection hole 111 when the end cover 10 is impacted by a pressure is reduced, and thus, the overall structural strength is improved.

In some embodiments, as shown in FIG. 1 and FIG. 2, a battery end cover assembly 100 includes an end cover 10, terminal assemblies 20 and a pressure relief mechanism 50, the terminal assemblies 20 and the pressure relief mechanism 50 are both disposed on the end cover 10, and the end cover 10 is provided with a liquid injection structure 11. The terminal assemblies 20, the liquid injection structure 11 and the pressure relief structure 50 are disposed at intervals in the length direction of the end cover 10, a figured formed by an outer contour of the end cover 10 has a width median line L1, and the terminal assemblies 20 and the pressure relief structure 50 are both disposed at intervals on the width median line L1.

The distances from the terminal assemblies 20 to two opposite sides of the end cover 10 are approximately consistent, during connection to other external components (such as a converging member), connection positions of the both are disposed in the center of the end cover 10 and are not excessively protruded to edges, which is beneficial to the protection for the connection reliability of connections. Particularly, when an external impact is generated, an impact force is not easily transferred to the connections of the terminal assemblies 20 and the other external components. The pressure relief mechanism 50 is further disposed on the width median line L1. Resistance borne when the pressure relief mechanism 50 relieves a pressure to two sides is approximately balanced, which is beneficial to smoother pressure relief.

Figure 10:
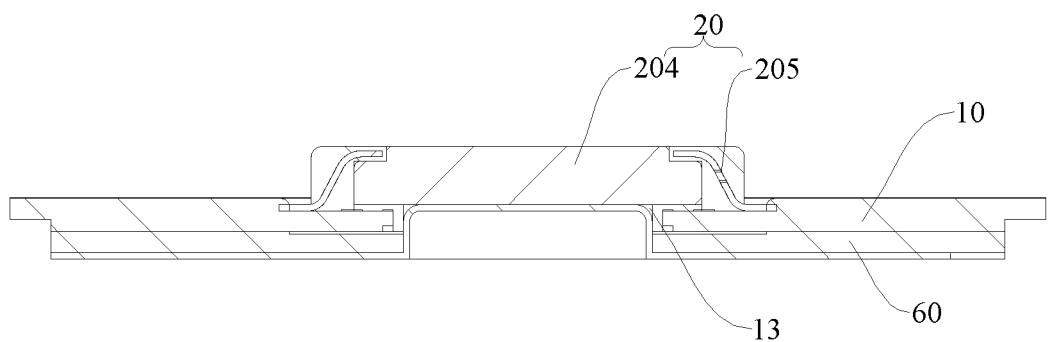
FIG. 10 is a sectional view of terminal assemblies of a battery end cover assembly according to some embodiments.

With reference to FIG. 3 and FIG. 10, a battery end cover assembly 100 according to an embodiment of the present application includes an end cover 10, terminal assemblies 20, a pressure relief mechanism 50 and an insulation board 60, and the terminal assemblies 20 and the pressure relief mechanism 50 are both disposed on the end cover 10. The end cover 10 is provided with an outer side surface 101 and an inner side surface 102 which are opposite in the thickness direction thereof, and the insulation board 60 is connected to the inner side surface 102 of the end cover 10.

It can be understood that the inner side surface 102 of the end cover 10 refers to a surface, facing the inside of a battery, of the end cover 10. That is, the battery end cover assembly 100 is internally provided with electrode assemblies 300, and the inner side surface 102 of the end cover 10 is disposed to face the electrode assemblies 300. The insulation board 60 is a component for separating the end cover 10 from the electrode assemblies 300 and is disposed on the side, facing the electrode assemblies 300, of the end cover 10, and the end cover 10 is insulated and isolated from the electrode assemblies 300 by the insulation board 60. The insulation board 60 is made of an insulating material and may be made of a material such as plastics and rubber. Moreover, after the battery end cover assembly 100 includes the insulation board 60, the end cover 10 is supported by the insulation board 60 so as to be improved in overall structural strength and not easy to deform and damage.

Specifically, as shown in FIG. 3, the insulation board 60 is provided with first avoidance holes 61 corresponding to the terminal assemblies 20 and a second avoidance hole 62 corresponding to the pressure relief mechanism 50. Therefore, the first avoidance holes 61 can facilitate electric connection between the terminal assemblies 20 and the electrode assemblies 300 therein, and the second avoidance hole 62 facilitates the impact of a gas to the pressure relief mechanism 50 via the second avoidance hole 62 during exhaust inside the battery.

In some specific embodiments, as shown in FIG. 3, the end cover 10 is provided with a liquid injection hole 111 penetrating in the thickness direction thereof. The battery end cover assembly 100 further includes a sealing nail 112 connected to the end cover 10 and covering the liquid injection hole 111, and the insulation board 60 is provided with a third avoidance hole 63 corresponding to the liquid injection hole 111, which aims at ensuring that an electrolyte can smoothly enter from the liquid injection hole 111 during liquid injection and flow to the electrode assemblies 300 via the third avoidance hole 63. During liquid injection, there is a little interference from the insulation board 60, the electrolyte flows more smoothly, and thus, the liquid injection efficiency can be increased. Furthermore, after the size and direction of the third avoidance hole 63 are reasonably set, the flow direction of the electrolyte can also be guided.

With reference to FIG. 1 to FIG. 3, a battery end cover assembly 100 according to an embodiment of the present application includes an end cover 10, terminal assemblies 20 and a pressure relief mechanism 50, and the terminal assemblies 20 and the pressure relief mechanism 50 are both disposed on the end cover 10.

As shown in FIG. 10, each of the terminal assemblies 20 may include an electrode terminal 204 and a connecting piece 205, the connecting piece 205 is a component for fixing the electrode terminal 204 to the end cover 10, and the electrode terminal 204 is a component for outputting electric energy of a battery. There may be one or two terminal assemblies 20 on the end cover 10.

In some embodiments, as shown in FIG. 2, the two terminal assemblies 20 are provided and are respectively a positive terminal assembly 21 and a negative terminal assembly 22, and the pressure relief mechanism 50 is located between the two terminal assemblies 20. Therefore, positive and negative electrode connection with other external components (such as a converging member) can be performed on the battery end cover assembly 100, positive and negative electrodes are centralized on the battery end cover assembly 100, so that the integration level is high, and the overall wiring and layout of the battery are more compact, which is beneficial to the reduction of the overall volume.

Specifically, as shown in FIG. 1, the distance between axes of the two terminal assemblies 20 is D1, the minimum distance between the axis of the negative terminal assembly 22 and an outer contour of the end cover 10 is D2, and $5 \leq D1/D2 \leq 7$. After such disposing, the two terminal assemblies 20 can be reasonably distributed in the length direction of the end cover 10, and the structural strength of the end cover 10 in a central area in the length direction can be improved, so that the deformation of the end cover 10 in the center is reduced, and the appearance and performance of the battery are improved.

With reference to FIG. 1 to FIG. 3, a battery end cover assembly 100 according to an embodiment in a first aspect of the present application includes an end cover 10, terminal assemblies 20 and a pressure relief mechanism 50, and the terminal assemblies 20 and the pressure relief mechanism 50 are both disposed on the end cover 10. The terminal assemblies 20 are used for internal and external electric energy transmission of a battery, and the pressure relief mechanism 50 is a component for relieving an internal pressure of the battery.

The pressure relief mechanism 50 and the terminal assemblies 20 are distributed at intervals in the length direction of the end cover 10. The area of a figure formed by an outer contour of the end cover 10 is a first area S1, the area of a projection of the pressure relief mechanism 50 on the end cover 10 is a second area S2, and the second area S2 accounts for 0.5% to 5% of the first area S1. The pressure relief mechanism 50 and the terminal assemblies 20 are distributed at intervals in the length direction of the end cover 10. The size of the pressure relief mechanism 50 in the length direction of the end cover 10 is b1 which is referred to as the length of the pressure relief mechanism 50, and the length b1 of the pressure relief mechanism 50 accounts for 5% to 12% of the length b0 of the end cover 10. The size of the pressure relief mechanism 50 in the width direction of the end cover 10 is e1 which is referred to as the width of the pressure relief mechanism 50, and the width e1 of the pressure relief mechanism 50 accounts for 15% to 25% of the width e0 of the end cover 10. Therefore, the pressure relief mechanism 50 can take up an area large enough for pressure relief and exhaust, thereby guaranteeing smooth and timely exhaust.

Meanwhile, each side, located on the pressure relief mechanism 50, of the end cover 10 does not have to be set to be too narrow, so that the risk that the edge of the end cover 10 is easily fractured due to the overlarge length and width of the pressure relief mechanism 50 is avoided, and the situation that the end cover 10 is bent and fractured when bearing an impact and a pressure is avoided. Moreover, there is a sufficient space for arranging components on the end cover 10 so that all the components can be spaced without mutual interference. Furthermore, the structural strength of the end cover 10 can be guaranteed, excessive deformation caused when the end cover 10 bears a pressure is avoided, the probability that a gas is exhausted from the edge of the end cover 10 when the internal temperature or pressure of the battery is overhigh is avoided, it is ensured that the gas is only exhausted from the pressure relief mechanism 50, the exhaust direction of the gas in the battery can be effectively controlled, it is convenient to perform subsequent treatment on exhausted electrolyte or high-temperature gas, and unwanted corrosion, fire hazards, etc. caused by arbitrary emission of the electrolyte or high-temperature gas in the battery are avoided.

Optionally, the proportion of the second area S2 to the first area S1 may be 0.8%, 1.0%, 1.2%, 1.3%, 1.5%, 1.7%, 2.1%, 2.3%, 2.5%, 2.8%, 3.0%, 3.4%, 3.7%, 3.9%, 4.1%, 4.3%, 4.5%, 4.8% and 5.0%.

Optionally, the proportion of the length b1 of the pressure relief mechanism 50 to the length b0 of the end cover 10 is 5%, 7%, 9%, 10%, 11.5%, 12%, etc.

Optionally, the proportion of the width e1 of the pressure relief mechanism 50 to the width e0 of the end cover 10 is 15%, 17%, 19%, 20%, 21.5%, 22.4%, 23.7%, 24.8%, 25%, etc.

In some embodiments, the pressure relief mechanism 50 is located on a geometric center of a figure formed by an outer contour of the end cover 10. For example, in FIG. 1, the end cover 10 is of a rectangle, and the pressure relief mechanism 50 is located on the intersection point of diagonal lines of the rectangle. Here, the distance from the pressure relief mechanism 50 to each position of the edge of the end cover 10 is relatively balanced, and an exhaust path from the inside of the battery to the pressure relief mechanism 50 is relatively short as a whole, which is beneficial to the improvement of a pressure relief effect, so that the situation of untimely pressure relief caused by an overlong distance between a partial position inside the battery and the pressure relief mechanism 50 is avoided, and the probability of partial explosion caused by untimely pressure relief is reduced. In other embodiments of the present application, it is also possible that the pressure relief mechanism 50 is not disposed in the center of the end cover 10, at the moment, the distance between the pressure relief mechanism 50 and the edge of the end cover 10 is also required to be reasonably set.

As shown in FIG. 1, the size of the pressure relief mechanism 50 in the length direction of the end cover 10 is b1, the minimum distance between the pressure relief mechanism 50 and each of the terminal assemblies 20 is b2, and b2>b1. By such disposing, the terminal assemblies 20 and other external components connected to the terminal assemblies 20 can be spaced from the pressure relief mechanism 50 by a sufficient distance. After the pressure relief mechanism 50 is opened, the pressure relief mechanism 50 is not easily blocked by the other external components, the probability that the internal gas and the electrolyte are ejected on the terminal assemblies 20 and the other external components when the pressure relief mechanism 50 performs pressure relief can be reduced, and the probability that the other external components catch fire is reduced. Moreover, after the pressure relief mechanism 50 is spaced from the terminal assemblies 20 for a safe distance, the risk of short circuit caused by conducting the positive and negative electrodes of the battery by an ejected material from the pressure relief mechanism 50 is not easily caused, and therefore, the safety of the battery can be improved.

Optionally, the minimum distance between the pressure relief mechanism 50 and each of the terminal assemblies 20 is b2, the length of the pressure relief mechanism 50 is b1, and 25%≤b1/b2≤35%. By such disposing, the distance between the pressure relief mechanism 50 and each of the terminal assemblies 20 can be long enough, and therefore, the risk that the ejected material from the pressure relief mechanism 50 is ejected to the terminal assemblies 20 is further reduced. Moreover, the pressure relief mechanism 50 and the terminal assemblies 20 are reasonably distributed on the end cover 10, so that interference generated by disposing the terminal assemblies 20 to be too close to the edge of the end cover 10 is avoided.

The terminal assemblies 20 are closer to the edge of the end cover 10 with respect to the pressure relief mechanism 50. As the edge of the end cover 10 is supported, the structural strength on the positions of the terminal assemblies 20 can be improved by virtue of the support borne by the edge of the end cover 10, pressures borne on the terminal assemblies 20 when the battery end cover assembly 100 bears a pressure can be reduced, and the probability that the terminal assemblies 20 are damaged to fall off can be reduced.

Further, optionally, b1/b2 may be 25%, 27.1%, 29.6%, 31.2%, 33.1%, 34.5%, 35%, etc.

In some embodiments, as shown in FIG. 4 and FIG. 5, the pressure relief mechanism 50 includes an anti-explosion valve 51, and the anti-explosion valve 51 includes a preset opening area 511. The preset opening area 511 is an area reserved for pressure relief when the anti-explosion valve 51 is designed. If pressure relief is required when the internal temperature or pressure of the battery is increased, the preset opening area 511 is opened, so that a pressure relief opening is formed in the anti-explosion valve 51, and the gas in the battery is exhausted from the pressure relief opening formed after the preset opening area 511 is opened. For facilitating description, here, the outer edge of the preset opening area 511 is referred to as a predetermined open boundary 512. The predetermined open boundary 512 is an edge contour of the pressure relief opening formed after the preset opening area 511 is opened.

As shown in FIG. 4 to FIG. 6, the anti-explosion valve 51 is provided with a notch groove 513, and the anti-explosion valve 51 on the position of the notch groove 513 is the thinnest, which is beneficial to the timely pressure relief and exhaust. Of course, solutions of the present application are not limited thereto, the preset opening area 511 can also be set to be of a thin wall as a whole, and any part of the thin wall can be torn off when being impacted by a pressure.

In some specific embodiments, the notch groove 513 is located in the preset opening area 511. In some optional embodiments, the notch groove 513 is located in a predetermined open boundary 512, that is, the notch groove 513 is disposed along the predetermined open boundary 512. For example, when the predetermined open boundary 512 is a rectangular line, a rectangular area defined by the predetermined open boundary 512 is the preset opening area 511, and the notch groove 513 is disposed along the rectangular line. When bearing a pressure, the anti-explosion valve 51 on the position of the notch groove 513 is fractured, and thus, a rectangular pressure relief opening can be formed. At the moment, the torn-off preset opening area 511 can be completely separated from the remaining parts of the anti-explosion valve 51 and can also be connected, on one side, to the remaining parts.

In some other optional embodiments, the notch groove 513 does not have to be disposed along the predetermined open boundary 512. For example, when the predetermined open boundary 512 is the rectangular line, the rectangular area defined by the predetermined open boundary 512 is the preset opening area 511, and the notch groove 513 is disposed along diagonal lines of the preset opening area 511. When bearing a pressure, the anti-explosion valve 51 on the position of the notch groove 513 is fractured, the preset opening area 511 can be torn off along the diagonal lines to form four triangular areas. After the preset opening area 511 is opened, the formed pressure relief opening is rectangular.

Optionally, segments of the notch groove 513 can be partially disposed along the predetermined open boundary 512 and partially located in the preset opening area 511. Therefore, the shape of the notch groove 513 is flexibly set.

In some embodiments, as shown in FIG. 8 and FIG. 9, the minimum thickness of the anti-explosion valve 51 on the position of the notch groove 513 is a first thickness n1, the thickness of the anti-explosion valve on the position of the preset opening area 511 is n2, and n1 accounts for 15% to 25% of n2. Here, the thickness proportions of the anti-explosion valve 51 on the positions of the notch groove 513 and the preset opening area 511 are limited, so that the preset opening area 511 cannot to be too thick while the anti-explosion valve 51 on the position of the notch groove 513 is relatively thin. The anti-explosion valve 51 on the position of the notch groove 513 is relatively thin, so that the anti-explosion valve 51 on the position of the notch groove 513 can be opened in time when an internal pressure or temperature of the battery reaches a threshold value. The preset opening area 511 cannot be too thick, so that the preset opening area 511 is easily impacted by the high-pressure gas after the position of the notch groove 513 is opened, and the pressure relief opening can be completely opened for smooth exhaust. By limiting the thickness of the anti-explosion valve 51 on the position of the preset opening area 511 to be at least four times as large as the thickness of that on the position of the notch groove 513, when the anti-explosion valve 51 is impacted by the internal pressure or is overhigh in temperature, the pressure can be centralized on the position of the notch groove 513, and the position, where the pressure is centralized on the position of the notch groove 513, of the anti-explosion valve 51 is opened, so that more timely exhaust is achieved, and the working sensitivity of the anti-explosion valve 51 is favorably improved.

Optionally, the ratio of n1 to n2 may be 15%, 17%, 20%, 23%, 25%, etc.

In some embodiments, as shown in FIG. 6 and FIG. 7, the area of a projection of the notch groove 513 on the end cover 10 is a third area S3, and the third area S3 accounts for 1.0% to 1.5% of the second area S2. The second area S2 is the area of a projection of the anti-explosion valve 51 on the end cover 10.

Here, the third area S3 is limited to account for 1.0% to 1.5% of the second area S2, that is, the area taken up on the anti-explosion valve 51 by the thinnest area on the anti-explosion valve 51 is limited. The proportion of the third area S3 to the second area S2 cannot be too small, there may be more areas on the position of the notch groove 513 to induce pressure or temperature variation when the internal pressure or temperature of the battery reaches the threshold value, so that the anti-explosion valve can be opened in time for pressure relief, and then, the working sensitivity of the anti-explosion valve 51 can be improved.

Optionally, the proportion of the third area S3 to the second area S2 may be 1.0%, 1.1%, 1.2%, 1.3%, 1.4%, 1.5%, etc.

In some embodiments, the tensile strength of the anti-explosion valve 51 is 90-130 N/mm², in this way, the situation that the anti-explosion valve 51 is opened when the internal pressure or temperature does not reach a threshold value due to instable performance caused by overlow tensile strength is avoided, and the situation that untimely exhaust caused by difficulty in opening the anti-explosion valve 51 due to overhigh tensile strength is also avoided. Therefore, the reasonable setting of the tensile strength of the anti-explosion valve 51 is beneficial to the improvement of the performance playing reliability and stability.

Specifically, within the range of the tensile strength 90-130 N/mm² of the anti-explosion valve 51, the tolerance pressure which can be borne by the anti-explosion valve 51 is approximately 0.4-0.8 MPa. Therefore, the tensile strength of the anti-explosion valve 51 should not be lower than 90 N/mm², the tolerance pressure which can be borne by the anti-explosion valve 51 is prevented from being far lower than 0.4 MPa, and the situation that the anti-explosion valve 51 is opened due to partial temporary temperature or pressure rise inside the battery is avoided, so that the anti-explosion valve 51 cannot be damaged under reasonable temperature or pressure variation, and the error rate of the anti-explosion valve 51 is reduced. The tensile strength of the anti-explosion valve 51 should not be more than 130 N/mm², and the tolerance pressure which can be borne by the anti-explosion valve 51 is prevented from being far more than 0.8 MPa, so that the situation that the anti-explosion valve 51 is still not opened when there is an explosion rise inside the battery is avoided, and it is ensured that the anti-explosion valve 51 can be opened in time for exhaust. An appropriate tensile strength is selected for the anti-explosion valve 51, so that the anti-explosion valve 51 is not easily damaged during machining and assembling, and the production defect rate of the battery end cover assembly is reduced.

Optionally, the tensile strength of the anti-explosion valve 51 is 90, 95, 100, 103, 108, 112, 116, 121, 128, 130, etc. (unit: N/mm²). Further, optionally, the tensile strength of the anti-explosion valve 51 is 110 N/mm².

In some specific embodiments, as shown in FIG. 8 and FIG. 9, a section, perpendicular to the extension direction of the notch groove 513, of the notch groove 513 is U-shaped or C-shaped. By adopting the U-shaped or C-shaped section, sharp corners on the contour of the notch groove 513 are reduced, the situation that the anti-explosion valve 51 generates overhigh centralized stresses on the weakest position is avoided, and thus, the probability that the anti-explosion valve 51 is opened on the position of a sharp corner due to overhigh centralized internal stresses is avoided. Therefore, by such disposing, the working reliability of the anti-explosion valve 51 can be improved.

Specifically, the contour line on the section, perpendicular to the extension direction of the notch groove 513, of the notch groove 513 includes a circular arc line of which the radius r1 is 0.05-0.15 mm. Here, the radius r1 of the circular arc line is limited to be at least 0.05 mm, therefore, on one hand, it is easy to machine the circular arc contour, and on the other hand, centralized stresses generated here are effectively reduced. The radius r1 of the circular arc line is limited to be not greater than 0.15 mm, so that the depth of the notch groove 513 and the minimum thickness of the anti-explosion valve 51 on the position of the notch groove 513 can be reasonably distributed.

Optionally, the radius r1 of the circular arc line may be 0.05, 0.07, 0.09, 0.10, 0.12, 0.13, 0.15 mm, etc.

In some embodiments, as shown in FIG. 3, the end cover 10 is provided with a liquid injection hole 111 penetrating in the thickness direction thereof. The battery end cover assembly 100 further includes a sealing nail 112 connected to the end cover 10 and covering the liquid injection hole 111. By such disposing, it is convenient to inject a liquid via the liquid injection hole 111 during production, not only is the production flexible, but also the number of times of liquid injection and the liquid injection time can be selected as required. The electrolyte can be replenished in time when being found to be insufficient by detection, so that the reject ratio of the battery is reduced. When the production is completed, sealing is performed by using the sealing nail 112, so that the sealing property is improved.

Optionally, the minimum distance between the liquid injection hole 111 and the pressure relief mechanism 50 is b3, the minimum distance between the liquid injection hole 111 and each of the terminal assemblies 20 is b4, and 1.5≤b3/b4≤2. It can be understood that the end cover 10 on the position of the liquid injection hole 111 is relatively weak in structure; and by disposing the liquid injection hole 111 to be closer to the terminal assembly 20 and farther from the pressure relief mechanism 50, on one hand, the situation that the liquid injection hole 111 is disposed to be too close to make the end cover 10 easy to deform here is avoided, on the other hand, the liquid injection hole 111 is protected to a certain extent by virtue of the structural strength of the terminal assembly 20, the deformation of the end cover 10 on the position of the liquid injection hole 111 when the end cover 10 is impacted by a pressure is reduced, and thus the overall structural strength is improved.

An energy storage apparatus 01A according to an embodiment in a second aspect of the present application includes the battery end cover assembly 100 according to the above-mentioned embodiment. For the energy storage apparatus 01A, by obtaining the battery end cover assembly 100 of which the area is matched with the pressure relief capacity, the smoothness of the anti-explosion pressure relief is guaranteed, meanwhile, the structural strength of the battery end cover assembly 100 is guaranteed, and thus, the use safety of the energy storage apparatus 01A is improved.

Figure 11:
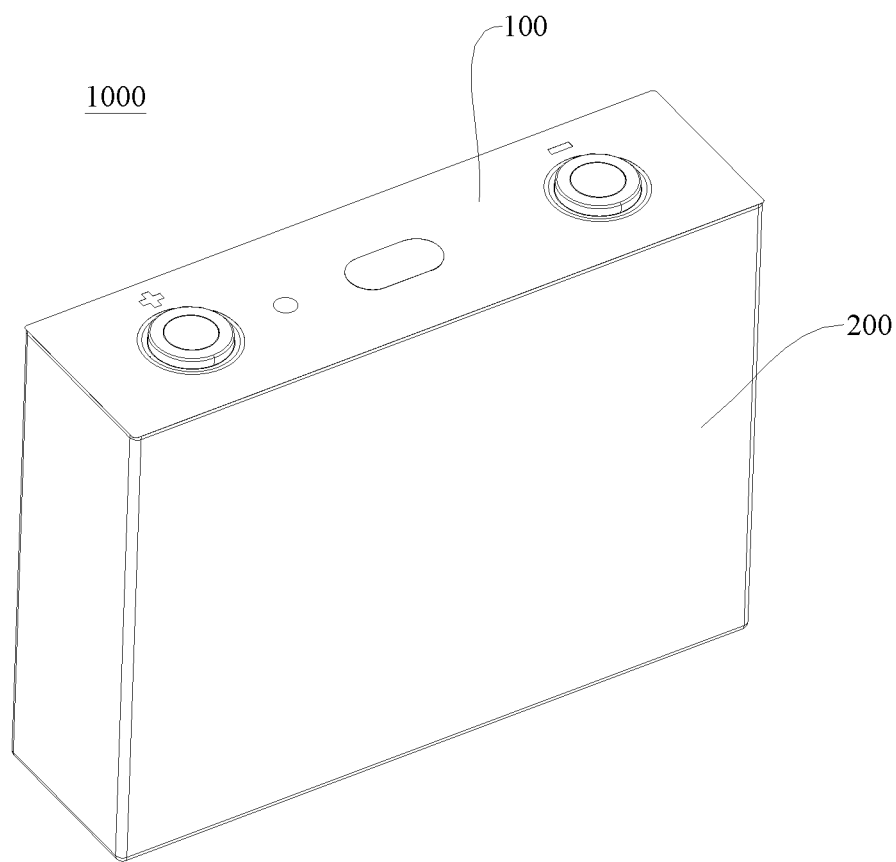
FIG. 11 is a three-dimensional view of a single battery according to some embodiments.
Figure 12:
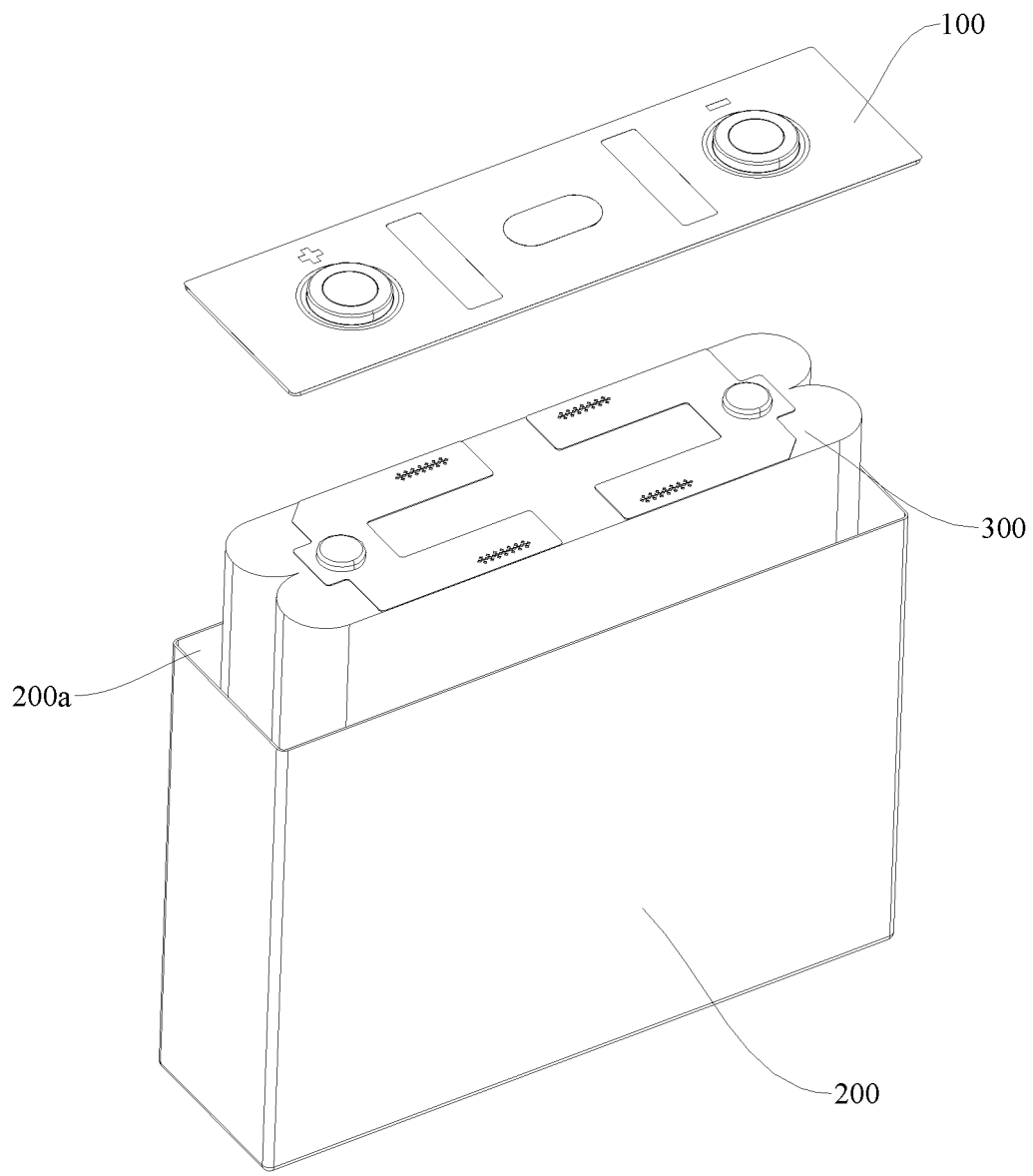
FIG. 12 is an exploded view of a single battery according to some other embodiments.
Figure 13:
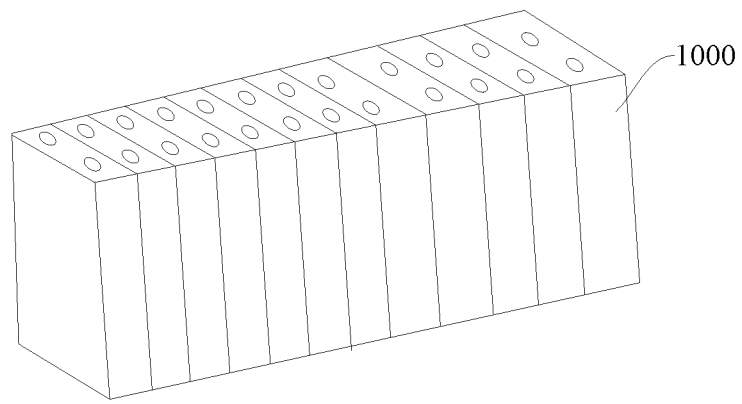
FIG. 13 is a three-dimensional view of a battery module according to some embodiments.
Figure 14:
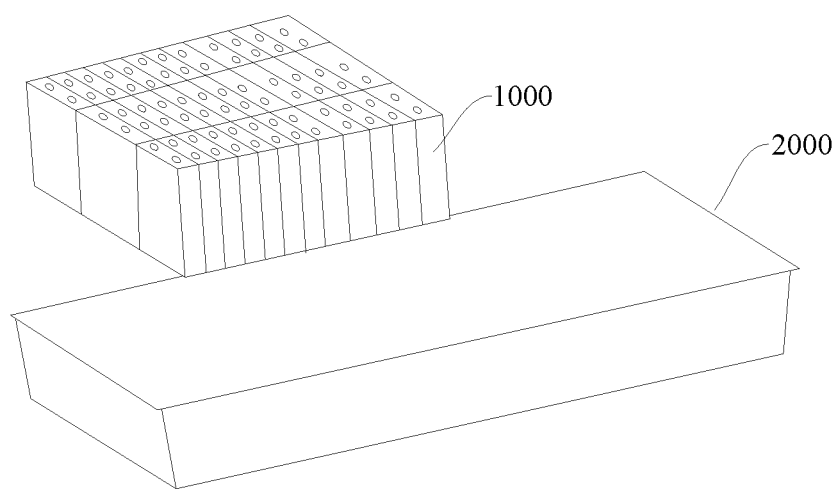
FIG. 14 is an exploded view of a battery pack according to some embodiments.

In the present application, the energy storage apparatus 01A may be a single battery 1000 as shown in FIG. 11 and FIG. 12 or a battery module 1000B as shown in FIG. 13 or a battery pack 1000C as shown in FIG. 14.

The single battery 1000 according to an embodiment of the present application, as shown in FIG. 11 to FIG. 12, includes a housing 200, electrode assemblies 300 and a battery end cover assembly 100, the housing 200 is provided with an opening 200a, the electrode assemblies 300 are accommodated in the housing 200, an end cover 10 of the battery end cover assembly 100 covers the opening 200a, and an inner side surface 102 of the end cover 10 is disposed to face the electrode assemblies 300.

With reference to FIG. 12, the housing 200 is a component for accommodating the electrode assemblies 300, and the housing 200 may be of a hollow structure formed with an opening 200a in one end or a hollow structure formed with openings 200a in two ends. The housing 200 may be of various shapes such as a cylinder and a cuboid. The housing 200 may be made of various materials such as copper, iron, aluminum, steel and aluminum alloy.

There may be one or more electrode assemblies 300 in the housing 200. For example, as shown in FIG. 12, there are a plurality of electrode assemblies 300 which are stacked.

The battery end cover assembly 100 is an assembly covering the opening 200a of the housing 200 to insulate the internal environment of the single battery 1000 from the external environment.

Specifically, the battery end cover assembly 100 includes an end cover 10, terminal assemblies 20 and a pressure relief mechanism 50, and the terminal assemblies 20 and the pressure relief mechanism 50 are both disposed on the end cover 10. The area of a figure formed by an outer contour of the end cover 10 is a first area S1, the area of a projection of the pressure relief mechanism 50 on the end cover 10 is a second area S2, and the second area S2 accounts for 0.5% to 5% of the first area S1.

The single battery 1000 according to an embodiment of the present application adopts the above-mentioned battery end cover assembly 100, the area taken up by the pressure relief mechanism 50 on the end cover 10 is reasonably set, and there is a pressure relief opening large enough for exhaust after the pressure relief mechanism 50 is opened, so that the area of the end of the single battery 1000 is relatively matched with the pressure relief capacity. In this way, the probability of untimely pressure relief is reduced, and the safety of the single battery 1000 is improved. Moreover, the overall structural strength of the battery end cover assembly 100 can be guaranteed, and the battery end cover assembly is not easy to deform after bearing a pressure, so that the reliability of the overall single battery 1000 can be improved.

It should be indicated that, in the present application, the single battery 1000 may include a lithium ion secondary battery, a lithium ion primary battery, a lithium-sulfur battery, a sodium-lithium ion battery, a sodium ion battery or a magnesium ion battery, etc., which is not limited in the embodiment of the present application. The single battery 1000 may be cylindrical, flat, cuboid or in other shapes, which is not limited in the embodiment of the present application. The single battery 1000 is generally divided into three types: a single cylinder battery, a single prismatic battery and a single pouch battery according to a packaging way, which is not limited either in the embodiment of the present application.

The housing 200 is internally provided with the electrode assemblies 300 and an electrolyte, and each of the electrode assemblies 300 is composed of a positive pole piece, a negative pole piece and an isolating membrane. The single battery 1000 mainly works by virtue of the movement of metal ions between the positive pole piece and the negative pole piece. The positive pole piece includes a positive current collector and a positive active material layer, the positive active material layer is coated on the surface of the positive current collector, the positive current collector uncoated with the positive active material layer protrudes out of the positive current collector coated with the positive active material layer, and the positive current collector uncoated with the positive active material layer is used as a positive tab. With a lithium ion battery as an example, the positive current collector may be made of aluminum, and the positive active material layer may be lithium cobaltate, lithium ion phosphate, ternary lithium or lithium manganate, etc. The negative pole piece includes a negative current collector and a negative active material layer, the negative active material layer is coated on the surface of the negative current collector, the negative current collector uncoated with the negative active material layer protrudes out of the negative current collector coated with the negative active material layer, and the negative current collector uncoated with the negative active material layer is used as a negative tab. The negative current collector may be made of copper, and the negative active material layer may be carbon or silicon, etc. In order to guarantee the passing of a heavy current without fusing, there are a plurality of positive tabs stacked together, and there are a plurality of negative tabs stacked together. The isolating membrane may be made of PP (polypropylene) or PE (polyethylene), etc. Furthermore, each of the electrode assemblies 300 may be of a wound structure or a laminated structure, and embodiments of the present application are not limited thereto.

Further, for the development of a battery technology, design factors in various aspects such as energy density, cycle life, discharge capacity, charge-discharge rate and other performance parameters have to be taken into account.

As shown in FIG. 3, in the single battery 1000, the battery end cover assembly 100 generally includes an end cover 10 and terminal assemblies 20, as shown in FIG. 10, each of the terminal assemblies 20 includes an electrode terminal 204 and a connecting piece 205, the electrode terminal 204 is fixed to the end cover 10 via the connecting piece 205, and the electrode terminal 204 is used to be electrically connected to the electrode assemblies 300 and is a component for outputting electric energy for the single battery 1000.

In some embodiments, the ratio of the capacity a of the single battery 1000 to the second area S2 is at least equal to 1.8, wherein the unit of the capacity a is ampere-hour (A-H), and the unit of the second area S2 is square millimeter ($mm^2$). In this way, the capacity a of the single battery 1000 can be further reasonably matched with the area taken up by the pressure relief mechanism 50.

Therefore, the pressure relief opening of the pressure relief mechanism 50 is relatively large, when abnormal conditions such as short circuit, overcharge and overdischarge occur to the single battery 1000, an internal pressure of the single battery 1000 sharply rises, and when the pressure reaches a set anti-explosion air pressure point of the battery, the pressure relief mechanism 50 can be instantly opened to ensure that the gas inside the single battery 1000 can be exhausted in time, prevent the single battery 1000 from being exploded and play a role of instantly and completely leaking the gas, and thus, the anti-explosion purpose is achieved.

The battery module 1000B according to an embodiment of the present application, as shown in FIG. 13, includes a plurality of single batteries 1000 which are arranged according to a certain sequence.

The battery pack 1000C according to an embodiment of the present application, as shown in FIG. 14, includes a box body 2000 and a battery module 1000B, and the box body 2000 is used for accommodating at least one battery module 1000B. The battery module 1000B is formed by arranging a plurality of single batteries 1000, and therefore, the battery pack 1000C includes the box body 2000 and the plurality of single batteries 1000.

The box body 2000 is a component for accommodating the single batteries 1000, provides an accommodating space for the single batteries 1000 and may be of various structures. In some embodiments, the box body 2000 may include a first part and a second part which are covered on each other to define an accommodating space for accommodating the single batteries 1000. The first part and the second part may be of various shapes such as a cuboid and a cylinder. The first part may be of a hollow structure opened in one side, the second part may also be of a hollow structure opened in one side, and the open side of the second part covers the open side of the first part to form the box body 2000 with the accommodating space. Or, the first part is of a hollow structure opened in one side, the second part is of a plate-like structure, and the second part covers the open side of the first part to form the box body 2000 with the accommodating space. The first part and the second part can be sealed by a sealing element which may be a sealing ring, a sealant, etc.

The box body 2000 can prevent liquid or other foreign matters from affecting the charge or discharge of the single batteries 1000.

In the battery pack 1000C, there may be one or more single batteries 1000. If there are a plurality of single batteries 1000, the plurality of single batteries 1000 are in series connection or parallel connection or parallel-series connection, and the parallel-series connection means that the plurality of single batteries 1000 are both in serial connection and parallel connection. It is possible that the plurality of single batteries 1000 are in series connection or parallel connection or parallel-series connection to form the battery module 1000B firstly, and then, a plurality of battery modules 1000B are in series connection or parallel connection or parallel-series connection to form an integral whole to be accommodated in the box body 2000. Or, all the single batteries 1000 are in direct series connection or parallel connection or parallel-series connection together, and then, the integral whole formed by all the single batteries 1000 is accommodated in the box body 2000.

In some embodiments, the battery pack 1000C may further include a converging member by which the plurality of single batteries 1000 can be electrically connected to achieve the series connection or parallel connection or parallel-series connection among of the plurality of single batteries 1000. The converging member may be a metal conductor such as copper, iron, aluminum, stainless steel and aluminum alloy.

Each of the plurality of single batteries 1000 in the battery pack 1000C according to an embodiment of the present application adopts the above-mentioned battery end cover assembly 100, and when being leaked during the assembly of the battery pack 1000C, a certain or some single batteries 1000 can be rapidly recognized, so that the overhaul convenience of the battery pack 1000C can be improved.

The technical solutions described in the embodiments of the present application are applicable to the energy storage apparatus 01A and an electric device 01 with the energy storage apparatus 01A.

The electric device 01 may be a vehicle, a mobile phone, a portable device, a notebook computer, a ship, a spacecraft, an electric toy, an electric tool, etc. The vehicle may be a fuel vehicle, a gas vehicle or a new energy vehicle, and the new energy vehicle may be a battery electric vehicle, a hybrid electric vehicle or a range-extended vehicle, etc.; the spacecraft includes an airplane, a rocket, an aerospace plane, a spaceship, etc.; the electric toy includes a fixed electric toy or a mobile electric toy, such as a game machine, an electric vehicle toy, an electric ship toy, an electric airplane toy, etc.; and the electric tool includes an electric metal cutting tool, an electric grinding tool, an electric assembling tool and an electric tool for a railway, such as an electric drill, an electric grinder, an electric wrench, an electric screwdriver, an electric hammer, an electric impact drill, a concrete vibrator, an electric planer, etc. The above-mentioned electric device 01 is not specifically limited in the embodiment of the present application.

For facilitating description, the electric device 10 which is a vehicle is used as an example to be described in the following embodiment.

Figure 15:
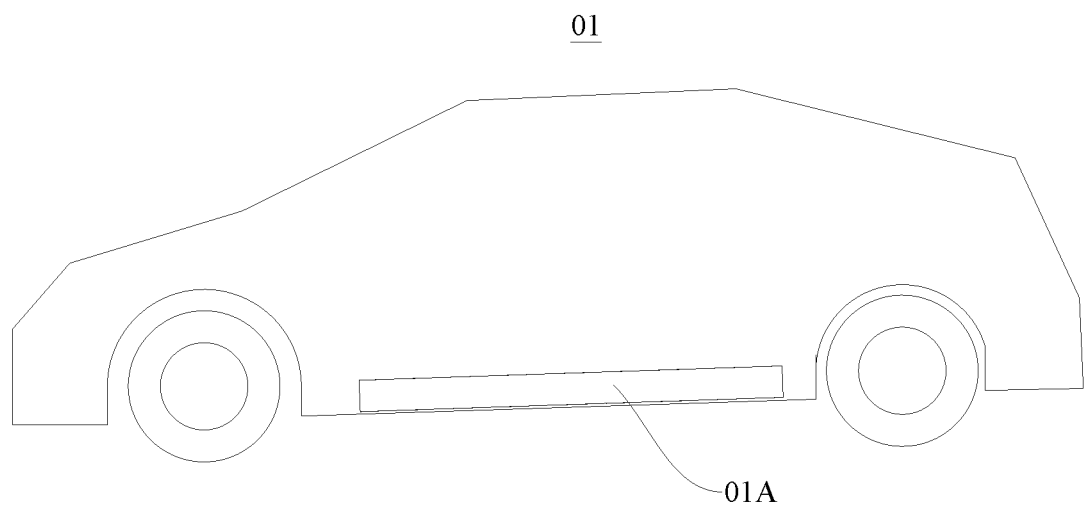
FIG. 15 is a schematic view of an electric device according to some embodiments.

With reference to FIG. 15 which is a schematic view of a vehicle according to some embodiments of the present application, the vehicle is internally provided with an energy storage apparatus 01A which may be disposed on the bottom, head or tail of the vehicle. The energy storage apparatus 01A may be used for supplying power for the vehicle, for example, the energy storage apparatus 01A may be used as an operational power supply for the vehicle.

The electric device 01 according to an embodiment of the present application adopts the above-mentioned energy storage apparatus 01A, so that the working stability as well as reliability and safety of the electric device 01 can be improved.

The vehicle may further include a controller and a motor, and the controller is used for controlling the energy storage apparatus 01A to supply power for the motor, for example, it is used for meeting the demands on working power when the vehicle is started, navigated and driven.

In some embodiments of the present application, the energy storage apparatus 01A not only can be used as the operational power supply for the vehicle, but also can be used as a driving power supply for the vehicle to replace or partially replace fuel or natural gas to supply a driving force to the vehicle.

The electric device 01 may also be an energy storage device such as an energy storage cabinet, and may be used as a charging cabinet for a mobile device or an energy storage device for other devices. For example, a solar power generation device may be configured with an energy storage cabinet, electric energy generated by solar power generation is temporarily stored in the energy storage cabinet so as to be utilized by an apparatus such as a sheet lamp and a bus stop board.

In the description of the present specification, the description with reference to terms such as "embodiment" and "example" is intended to indicate that specific features, structures, material or characteristics described in conjunction with the embodiment or example are included in at least one embodiment or example of the present application. In the present specification, the schematic statement for the above-mentioned terms does not necessarily refer to the same embodiment or example. Moreover, the described specific features, structures, materials or characteristics may be combined in an appropriate way in any one or more embodiments or examples.

Although the embodiments of the present application have been shown and described, those of ordinary skill in the art can understand that various variations, alterations, replacements and modifications can be made to these embodiments without departing from the principle and intention of the present application, and the scope of the present application is defined by the claims and equivalents thereof.

What is claimed is:

1. A battery end cover assembly, comprising:
   an end cover;
   terminal assemblies, the terminal assemblies being connected to the end cover; and
   a pressure relief mechanism, the pressure relief mechanism being disposed on the end cover, and the pressure relief mechanism and the terminal assemblies being distributed at intervals in the length direction of the end cover;
   wherein the area of a figure formed by an outer contour of the end cover is a first area S1, the area of a projection of the pressure relief mechanism on the end cover is a second area S2, and the second area S2 accounts for 0.5% to 5% of the first area S1;
   the size of the pressure relief mechanism in the length direction of the end cover is b1, and b1 accounts for 5% to 12% of the length b0 of the end cover; and the size of the pressure relief mechanism in the width direction of the end cover is e1, and e1 accounts for 15% to 25% of the width e0 of the end cover;

wherein the pressure relief mechanism comprises an anti-explosion valve, and the anti-explosion valve comprises a preset opening area;

the anti-explosion valve is provided with a notch groove, and the notch groove is located in the preset opening area;

the minimum thickness of the anti-explosion valve on the position of the notch groove is a first thickness n1, the thickness of the anti-explosion valve on the position of the preset opening area is a second thickness n2, and the first thickness n1 accounts for 15% to 25% of the second thickness n2; and a tensile strength of the anti-explosion valve is 90-130 N/mm²;

wherein a contour line on a section, perpendicular to the extension direction of the notch groove, of the notch groove comprises a circular arc line of which the radius r1 is 0.05-0.15 mm.

2. The battery end cover assembly of claim 1, wherein the area of a projection of the notch groove on the end cover is a third area S3, and the third area S3 accounts for 1.0% to 1.5% of the second area S2.

3. The battery end cover assembly of claim 1, wherein a contour line on a section, perpendicular to the extension direction of the notch groove, of the notch groove is U-shaped or C-shaped.

4. The battery end cover assembly of claim 1, wherein the minimum distance between the pressure relief mechanism and each of the terminal assemblies is b2, and b2>b1.

5. The battery end cover assembly of claim 4, wherein $25\% \leq b1/b2 \leq 35\%$.

6. The battery end cover assembly of claim 1, wherein the pressure relief mechanism is located on a geometric center of a figure formed by the outer contour of the end cover.

7. The battery end cover assembly of claim 1, wherein the end cover is provided with a liquid injection hole penetrating in the thickness direction thereof, and the liquid injection hole is located between one of the terminal assemblies and the pressure relief mechanism; and the minimum distance between the liquid injection hole and the pressure relief mechanism is b3, the minimum distance between the liquid injection hole and one of the terminal assemblies is b4, and $1.5 \leq b3/b4 \leq 2$.

8. The battery end cover assembly of claim 1, wherein two terminal assemblies are provided and are respectively a positive terminal assembly and a negative terminal assembly, the pressure relief mechanism is located between the two terminal assemblies, the distance between axes of the two terminal assemblies is D1, the minimum distance between the axis of the negative terminal assembly and the outer contour of the end cover is D2, and $5 \leq D1/D2 \leq 7$.

9. An energy storage apparatus comprising a battery end cover assembly, wherein the battery end cover assembly comprises:

an end cover;

terminal assemblies, the terminal assemblies being connected to the end cover; and a pressure relief mechanism, the pressure relief mechanism being disposed on the end cover, and the pressure relief mechanism and the terminal assemblies being distributed at intervals in the length direction of the end cover;

wherein the area of a figure formed by an outer contour of the end cover is a first area S1, the area of a projection of the pressure relief mechanism on the end cover is a second area S2, and the second area S2 accounts for 0.5% to 5% of the first area S1;

the size of the pressure relief mechanism in the length direction of the end cover is b1, and b1 accounts for 5% to 12% of the length b0 of the end cover; and the size of the pressure relief mechanism in the width direction of the end cover is e1, and e1 accounts for 15% to 25% of the width e0 of the end cover;

wherein the pressure relief mechanism comprises an anti-explosion valve, and the anti-explosion valve comprises a preset opening area;

the anti-explosion valve is provided with a notch groove, and the notch groove is located in the preset opening area;

the minimum thickness of the anti-explosion valve on the position of the notch groove is a first thickness n1, the thickness of the anti-explosion valve on the position of the preset opening area is a second thickness n2, and the first thickness n1 accounts for 15% to 25% of the second thickness n2;

wherein a contour line on a section, perpendicular to the extension direction of the notch groove, of the notch groove comprises a circular arc line of which the radius r1 is 0.05-0.15 mm.

10. The energy storage apparatus of claim 9, wherein the area of a projection of the notch groove on the end cover is a third area S3, and the third area S3 accounts for 1.0% to 1.5% of the second area S2.

11. The energy storage apparatus of claim 9, wherein a contour line on a section, perpendicular to the extension direction of the notch groove, of the notch groove is U-shaped or C-shaped.

12. The energy storage apparatus of claim 9, wherein the minimum distance between the pressure relief mechanism and each of the terminal assemblies is b2, and b2>b1.

13. The energy storage apparatus of claim 12, wherein $25\% \leq b1/b2 \leq 35\%$.

14. The energy storage apparatus of claim 9, wherein the pressure relief mechanism is located on a geometric center of a figure formed by the outer contour of the end cover.

15. The energy storage apparatus of claim 9, wherein the end cover is provided with a liquid injection hole penetrating in the thickness direction thereof, and the liquid injection hole is located between one of the terminal assemblies and the pressure relief mechanism; and the minimum distance between the liquid injection hole and the pressure relief mechanism is b3, the minimum distance between the liquid injection hole and one of the terminal assemblies is b4, and $1.5 \leq b3/b4 \leq 2$.

16. The energy storage apparatus of claim 9, wherein two terminal assemblies are provided and are respectively a positive terminal assembly and a negative terminal assembly, the pressure relief mechanism is located between the two terminal assemblies, the distance between axes of the two terminal assemblies is D1, the minimum distance between the axis of the negative terminal assembly and the outer contour of the end cover is D2, and $5 \leq D1/D2 \leq 7$.

17. An electric device, comprising the energy storage apparatus of claim 9.

\* \* \* \* \*